(12) United States Patent
Bessettes et al.

(10) Patent No.: US 9,521,331 B2
(45) Date of Patent: Dec. 13, 2016

(54) CAPTURING A GRAPHIC INFORMATION PRESENTATION

(71) Applicant: Hand Held Products, Inc., Fort Mill, SC (US)

(72) Inventors: Vincent Bessettes, Toulouse (FR); Patrice Thebault, Lapeyrouse-Fossat (FR)

(73) Assignee: Hand Held Products, Inc., Fort Mill, SC (US)

( * ) Notice: Subject to any disclaimer, the term of this patent is extended or adjusted under 35 U.S.C. 154(b) by 0 days.

(21) Appl. No.: 14/691,821

(22) Filed: Apr. 21, 2015

(65) Prior Publication Data

US 2016/0316124 A1    Oct. 27, 2016

(51) Int. Cl.
  *G06K 7/10*    (2006.01)
  *H04N 5/235*    (2006.01)

(52) U.S. Cl.
  CPC .......... *H04N 5/2351* (2013.01); *H04N 5/2352* (2013.01)

(58) Field of Classification Search
  USPC ......... 235/454, 455, 462.01, 462.14, 462.25, 235/462.42, 462.45, 462.49, 472.01
  See application file for complete search history.

(56) References Cited

U.S. PATENT DOCUMENTS

| | | | |
|---|---|---|---|
| 5,572,006 A * | 11/1996 | Wang | G06K 7/10564 235/454 |
| 6,832,725 B2 | 12/2004 | Gardiner et al. | |
| 7,128,266 B2 | 10/2006 | Zhu et al. | |
| 7,159,783 B2 | 1/2007 | Walczyk et al. | |
| 7,413,127 B2 | 8/2008 | Ehrhart et al. | |
| 7,726,575 B2 | 6/2010 | Wang et al. | |
| 8,294,969 B2 | 10/2012 | Plesko | |
| 8,317,105 B2 | 11/2012 | Kotlarsky et al. | |
| 8,322,622 B2 | 12/2012 | Liu | |
| 8,366,005 B2 | 2/2013 | Kotlarsky et al. | |
| 8,371,507 B2 | 2/2013 | Haggerty et al. | |
| 8,376,233 B2 | 2/2013 | Van Horn et al. | |
| 8,381,979 B2 | 2/2013 | Franz | |

(Continued)

FOREIGN PATENT DOCUMENTS

| | | |
|---|---|---|
| WO | 2013163789 A1 | 11/2013 |
| WO | 2013173985 A1 | 11/2013 |

(Continued)

OTHER PUBLICATIONS

U.S. Appl. No. 14/519,179 for Dimensioning System With Multipath Interference Mitigation filed Oct. 21, 2014 (Thuries et al.); 30 pages.

(Continued)

*Primary Examiner* — Tuyen K Vo
(74) *Attorney, Agent, or Firm* — Additon, Higgins & Pendleton, P.A.

(57) ABSTRACT

A process is disclosed for scanning a graphic medium scan target. An image of the scan target is captured over an exposure duration. An illumination of the scan target is actuated over an illumination duration brief relative to the exposure duration. The illumination of the scan target is deactivated upon an expiration of the illumination duration. The capturing the image step continues over a significant portion of the exposure duration persisting after the expiration of the illumination duration.

20 Claims, 9 Drawing Sheets

(56) References Cited

U.S. PATENT DOCUMENTS

| | | |
|---|---|---|
| 8,387,881 B2 * | 3/2013 | Van Volkinburg . G06K 7/10386 235/455 |
| 8,390,909 B2 | 3/2013 | Plesko |
| 8,408,464 B2 | 4/2013 | Zhu et al. |
| 8,408,468 B2 | 4/2013 | Horn et al. |
| 8,408,469 B2 | 4/2013 | Good |
| 8,424,768 B2 | 4/2013 | Rueblinger et al. |
| 8,448,863 B2 | 5/2013 | Xian et al. |
| 8,457,013 B2 | 6/2013 | Essinger et al. |
| 8,459,557 B2 | 6/2013 | Havens et al. |
| 8,469,272 B2 | 6/2013 | Kearney |
| 8,474,712 B2 | 7/2013 | Kearney et al. |
| 8,479,992 B2 | 7/2013 | Kotlarsky et al. |
| 8,490,877 B2 | 7/2013 | Kearney |
| 8,517,271 B2 | 8/2013 | Kotlarsky et al. |
| 8,523,076 B2 | 9/2013 | Good |
| 8,528,818 B2 | 9/2013 | Ehrhart et al. |
| 8,544,737 B2 | 10/2013 | Gomez et al. |
| 8,548,420 B2 | 10/2013 | Grunow et al. |
| 8,550,335 B2 | 10/2013 | Samek et al. |
| 8,550,354 B2 | 10/2013 | Gannon et al. |
| 8,550,357 B2 | 10/2013 | Kearney |
| 8,556,174 B2 | 10/2013 | Kosecki et al. |
| 8,556,176 B2 | 10/2013 | Van Horn et al. |
| 8,556,177 B2 | 10/2013 | Hussey et al. |
| 8,559,767 B2 | 10/2013 | Barber et al. |
| 8,561,895 B2 | 10/2013 | Gomez et al. |
| 8,561,903 B2 | 10/2013 | Sauerwein |
| 8,561,905 B2 | 10/2013 | Edmonds et al. |
| 8,565,107 B2 | 10/2013 | Pease et al. |
| 8,571,307 B2 | 10/2013 | Li et al. |
| 8,579,200 B2 | 11/2013 | Samek et al. |
| 8,583,924 B2 | 11/2013 | Caballero et al. |
| 8,584,945 B2 | 11/2013 | Wang et al. |
| 8,587,595 B2 | 11/2013 | Wang |
| 8,587,697 B2 | 11/2013 | Hussey et al. |
| 8,588,869 B2 | 11/2013 | Sauerwein et al. |
| 8,590,789 B2 | 11/2013 | Nahill et al. |
| 8,596,539 B2 | 12/2013 | Havens et al. |
| 8,596,542 B2 | 12/2013 | Havens et al. |
| 8,596,543 B2 | 12/2013 | Havens et al. |
| 8,599,271 B2 | 12/2013 | Havens et al. |
| 8,599,957 B2 | 12/2013 | Peake et al. |
| 8,600,158 B2 | 12/2013 | Li et al. |
| 8,600,167 B2 | 12/2013 | Showering |
| 8,602,309 B2 | 12/2013 | Longacre et al. |
| 8,608,053 B2 | 12/2013 | Meier et al. |
| 8,608,071 B2 | 12/2013 | Liu et al. |
| 8,611,309 B2 | 12/2013 | Wang et al. |
| 8,615,487 B2 | 12/2013 | Gomez et al. |
| 8,621,123 B2 | 12/2013 | Caballero |
| 8,622,303 B2 | 1/2014 | Meier et al. |
| 8,628,013 B2 | 1/2014 | Ding |
| 8,628,015 B2 | 1/2014 | Wang et al. |
| 8,628,016 B2 | 1/2014 | Winegar |
| 8,629,926 B2 | 1/2014 | Wang |
| 8,630,491 B2 | 1/2014 | Longacre et al. |
| 8,635,309 B2 | 1/2014 | Berthiaume et al. |
| 8,636,200 B2 | 1/2014 | Kearney |
| 8,636,212 B2 | 1/2014 | Nahill et al. |
| 8,636,215 B2 | 1/2014 | Ding et al. |
| 8,636,224 B2 | 1/2014 | Wang |
| 8,638,806 B2 | 1/2014 | Wang et al. |
| 8,640,958 B2 | 2/2014 | Lu et al. |
| 8,640,960 B2 | 2/2014 | Wang et al. |
| 8,643,717 B2 | 2/2014 | Li et al. |
| 8,646,692 B2 | 2/2014 | Meier et al. |
| 8,646,694 B2 | 2/2014 | Wang et al. |
| 8,657,200 B2 | 2/2014 | Ren et al. |
| 8,659,397 B2 | 2/2014 | Vargo et al. |
| 8,668,149 B2 | 3/2014 | Good |
| 8,678,285 B2 | 3/2014 | Kearney |
| 8,678,286 B2 | 3/2014 | Smith et al. |
| 8,682,077 B1 | 3/2014 | Longacre |
| D702,237 S | 4/2014 | Oberpriller et al. |
| 8,687,282 B2 | 4/2014 | Feng et al. |
| 8,692,927 B2 | 4/2014 | Pease et al. |
| 8,695,880 B2 | 4/2014 | Bremer et al. |
| 8,698,949 B2 | 4/2014 | Grunow et al. |
| 8,702,000 B2 | 4/2014 | Barber et al. |
| 8,717,494 B2 | 5/2014 | Gannon |
| 8,720,783 B2 | 5/2014 | Biss et al. |
| 8,723,804 B2 | 5/2014 | Fletcher et al. |
| 8,723,904 B2 | 5/2014 | Marty et al. |
| 8,727,223 B2 | 5/2014 | Wang |
| 8,740,082 B2 | 6/2014 | Wilz |
| 8,740,085 B2 | 6/2014 | Furlong et al. |
| 8,746,563 B2 | 6/2014 | Hennick et al. |
| 8,750,445 B2 | 6/2014 | Peake et al. |
| 8,752,766 B2 | 6/2014 | Xian et al. |
| 8,756,059 B2 | 6/2014 | Braho et al. |
| 8,757,495 B2 | 6/2014 | Qu et al. |
| 8,760,563 B2 | 6/2014 | Koziol et al. |
| 8,763,909 B2 | 7/2014 | Reed et al. |
| 8,777,108 B2 | 7/2014 | Coyle |
| 8,777,109 B2 | 7/2014 | Oberpriller et al. |
| 8,779,898 B2 | 7/2014 | Havens et al. |
| 8,781,520 B2 | 7/2014 | Payne et al. |
| 8,783,573 B2 | 7/2014 | Havens et al. |
| 8,789,757 B2 | 7/2014 | Barten |
| 8,789,758 B2 | 7/2014 | Hawley et al. |
| 8,789,759 B2 | 7/2014 | Xian et al. |
| 8,794,520 B2 | 8/2014 | Wang et al. |
| 8,794,522 B2 | 8/2014 | Ehrhart |
| 8,794,525 B2 | 8/2014 | Amundsen et al. |
| 8,794,526 B2 | 8/2014 | Wang et al. |
| 8,798,367 B2 | 8/2014 | Ellis |
| 8,807,431 B2 | 8/2014 | Wang et al. |
| 8,807,432 B2 | 8/2014 | Van Horn et al. |
| 8,820,630 B2 | 9/2014 | Qu et al. |
| 8,822,848 B2 | 9/2014 | Meagher |
| 8,824,692 B2 | 9/2014 | Sheerin et al. |
| 8,824,696 B2 | 9/2014 | Braho |
| 8,842,849 B2 | 9/2014 | Wahl et al. |
| 8,844,822 B2 | 9/2014 | Kotlarsky et al. |
| 8,844,823 B2 | 9/2014 | Fritz et al. |
| 8,849,019 B2 | 9/2014 | Li et al. |
| D716,285 S | 10/2014 | Chaney et al. |
| 8,851,383 B2 | 10/2014 | Yeakley et al. |
| 8,854,633 B2 | 10/2014 | Laffargue |
| 8,866,963 B2 | 10/2014 | Grunow et al. |
| 8,868,421 B2 | 10/2014 | Braho et al. |
| 8,868,519 B2 | 10/2014 | Maloy et al. |
| 8,868,802 B2 | 10/2014 | Barten |
| 8,868,803 B2 | 10/2014 | Caballero |
| 8,870,074 B1 | 10/2014 | Gannon |
| 8,879,639 B2 | 11/2014 | Sauerwein |
| 8,880,426 B2 | 11/2014 | Smith |
| 8,881,983 B2 | 11/2014 | Havens et al. |
| 8,881,987 B2 | 11/2014 | Wang |
| 8,903,172 B2 | 12/2014 | Smith |
| 8,908,995 B2 | 12/2014 | Benos et al. |
| 8,910,870 B2 | 12/2014 | Li et al. |
| 8,910,875 B2 | 12/2014 | Ren et al. |
| 8,914,290 B2 | 12/2014 | Hendrickson et al. |
| 8,914,788 B2 | 12/2014 | Pettinelli et al. |
| 8,915,439 B2 | 12/2014 | Feng et al. |
| 8,915,444 B2 | 12/2014 | Havens et al. |
| 8,916,789 B2 | 12/2014 | Woodburn |
| 8,918,250 B2 | 12/2014 | Hollifield |
| 8,918,564 B2 | 12/2014 | Caballero |
| 8,925,818 B2 | 1/2015 | Kosecki et al. |
| 8,939,374 B2 | 1/2015 | Jovanovski et al. |
| 8,942,480 B2 | 1/2015 | Ellis |
| 8,944,313 B2 | 2/2015 | Williams et al. |
| 8,944,327 B2 | 2/2015 | Meier et al. |
| 8,944,332 B2 | 2/2015 | Harding et al. |
| 8,950,678 B2 | 2/2015 | Germaine et al. |
| D723,560 S | 3/2015 | Zhou et al. |
| 8,967,468 B2 | 3/2015 | Gomez et al. |
| 8,971,346 B2 | 3/2015 | Sevier |
| 8,976,030 B2 | 3/2015 | Cunningham et al. |
| 8,976,368 B2 | 3/2015 | Akel et al. |
| 8,978,981 B2 | 3/2015 | Guan |

(56) References Cited

U.S. PATENT DOCUMENTS

| | | |
|---|---|---|
| 8,978,983 B2 | 3/2015 | Bremer et al. |
| 8,978,984 B2 | 3/2015 | Hennick et al. |
| 8,985,456 B2 | 3/2015 | Zhu et al. |
| 8,985,457 B2 | 3/2015 | Soule et al. |
| 8,985,459 B2 | 3/2015 | Kearney et al. |
| 8,985,461 B2 | 3/2015 | Gelay et al. |
| 8,988,578 B2 | 3/2015 | Showering |
| 8,988,590 B2 | 3/2015 | Gillet et al. |
| 8,991,704 B2 | 3/2015 | Hopper et al. |
| 8,996,194 B2 | 3/2015 | Davis et al. |
| 8,996,384 B2 | 3/2015 | Funyak et al. |
| 8,998,091 B2 | 4/2015 | Edmonds et al. |
| 9,002,641 B2 | 4/2015 | Showering |
| 9,007,368 B2 | 4/2015 | Laffargue et al. |
| 9,010,641 B2 | 4/2015 | Qu et al. |
| 9,015,513 B2 | 4/2015 | Murawski et al. |
| 9,016,576 B2 | 4/2015 | Brady et al. |
| D730,357 S | 5/2015 | Fitch et al. |
| 9,022,288 B2 | 5/2015 | Nahill et al. |
| 9,030,964 B2 | 5/2015 | Essinger et al. |
| 9,033,240 B2 | 5/2015 | Smith et al. |
| 9,033,242 B2 | 5/2015 | Gillet et al. |
| 9,036,054 B2 | 5/2015 | Koziol et al. |
| 9,037,344 B2 | 5/2015 | Chamberlin |
| 9,038,911 B2 | 5/2015 | Xian et al. |
| 9,038,915 B2 | 5/2015 | Smith |
| D730,901 S | 6/2015 | Oberpriller et al. |
| D730,902 S | 6/2015 | Fitch et al. |
| D733,112 S | 6/2015 | Chaney et al. |
| 9,047,098 B2 | 6/2015 | Barten |
| 9,047,359 B2 | 6/2015 | Caballero et al. |
| 9,047,420 B2 | 6/2015 | Caballero |
| 9,047,525 B2 | 6/2015 | Barber |
| 9,047,531 B2 | 6/2015 | Showering et al. |
| 9,049,640 B2 | 6/2015 | Wang et al. |
| 9,053,055 B2 | 6/2015 | Caballero |
| 9,053,378 B1 | 6/2015 | Hou et al. |
| 9,053,380 B2 | 6/2015 | Xian et al. |
| 9,057,641 B2 | 6/2015 | Amundsen et al. |
| 9,058,526 B2 | 6/2015 | Powilleit |
| 9,064,165 B2 | 6/2015 | Havens et al. |
| 9,064,167 B2 | 6/2015 | Xian et al. |
| 9,064,168 B2 | 6/2015 | Todeschini et al. |
| 9,064,254 B2 | 6/2015 | Todeschini et al. |
| 9,066,032 B2 | 6/2015 | Wang |
| 9,070,032 B2 | 6/2015 | Corcoran |
| D734,339 S | 7/2015 | Zhou et al. |
| D734,751 S | 7/2015 | Oberpriller et al. |
| 9,082,023 B2 | 7/2015 | Feng et al. |
| 2001/0027999 A1* | 10/2001 | Lee .................. G06K 7/10732 235/462.45 |
| 2005/0205677 A1* | 9/2005 | Patel ................ G06K 7/10752 235/454 |
| 2006/0202036 A1* | 9/2006 | Wang ................ G06K 7/10722 235/462.07 |
| 2007/0063048 A1 | 3/2007 | Havens et al. |
| 2009/0134221 A1 | 5/2009 | Zhu et al. |
| 2010/0177076 A1 | 7/2010 | Essinger et al. |
| 2010/0177080 A1 | 7/2010 | Essinger et al. |
| 2010/0177707 A1 | 7/2010 | Essinger et al. |
| 2010/0177749 A1 | 7/2010 | Essinger et al. |
| 2010/0187315 A1* | 7/2010 | Goren .................. G06K 7/14 235/462.42 |
| 2011/0169999 A1 | 7/2011 | Grunow et al. |
| 2011/0202554 A1 | 8/2011 | Powilleit et al. |
| 2011/0215154 A1* | 9/2011 | He .................... G06K 7/10722 235/470 |
| 2012/0091206 A1* | 4/2012 | Goren .................. G06K 7/14 235/470 |
| 2012/0111946 A1 | 5/2012 | Golant |
| 2012/0168512 A1 | 7/2012 | Kotlarsky et al. |
| 2012/0193423 A1 | 8/2012 | Samek |
| 2012/0203647 A1 | 8/2012 | Smith |
| 2012/0223141 A1 | 9/2012 | Good et al. |
| 2012/0287332 A1* | 11/2012 | Fjellstad ............ G06K 7/10732 348/362 |
| 2013/0001309 A1* | 1/2013 | Barkan .............. G06K 7/10722 235/455 |
| 2013/0043312 A1 | 2/2013 | Van Horn |
| 2013/0062412 A1 | 3/2013 | Tan et al. |
| 2013/0075168 A1 | 3/2013 | Amundsen et al. |
| 2013/0175341 A1 | 7/2013 | Kearney et al. |
| 2013/0175343 A1 | 7/2013 | Good |
| 2013/0257744 A1 | 10/2013 | Daghigh et al. |
| 2013/0257759 A1 | 10/2013 | Daghigh |
| 2013/0270346 A1 | 10/2013 | Xian et al. |
| 2013/0287258 A1 | 10/2013 | Kearney |
| 2013/0292475 A1 | 11/2013 | Kotlarsky et al. |
| 2013/0292477 A1 | 11/2013 | Hennick et al. |
| 2013/0293539 A1 | 11/2013 | Hunt et al. |
| 2013/0293540 A1 | 11/2013 | Laffargue et al. |
| 2013/0306728 A1 | 11/2013 | Thuries et al. |
| 2013/0306731 A1 | 11/2013 | Pedrao |
| 2013/0307964 A1 | 11/2013 | Bremer et al. |
| 2013/0308625 A1 | 11/2013 | Park et al. |
| 2013/0313324 A1 | 11/2013 | Koziol et al. |
| 2013/0313325 A1 | 11/2013 | Wilz et al. |
| 2013/0342717 A1 | 12/2013 | Havens et al. |
| 2014/0001267 A1 | 1/2014 | Giordano et al. |
| 2014/0002828 A1 | 1/2014 | Laffargue et al. |
| 2014/0008439 A1 | 1/2014 | Wang |
| 2014/0025584 A1 | 1/2014 | Liu et al. |
| 2014/0034734 A1 | 2/2014 | Sauerwein |
| 2014/0036848 A1 | 2/2014 | Pease et al. |
| 2014/0039693 A1 | 2/2014 | Havens et al. |
| 2014/0042814 A1 | 2/2014 | Kather et al. |
| 2014/0049120 A1 | 2/2014 | Kohtz et al. |
| 2014/0049635 A1 | 2/2014 | Laffargue et al. |
| 2014/0061306 A1 | 3/2014 | Wu et al. |
| 2014/0063289 A1 | 3/2014 | Hussey et al. |
| 2014/0066136 A1 | 3/2014 | Sauerwein et al. |
| 2014/0067692 A1 | 3/2014 | Ye et al. |
| 2014/0070005 A1 | 3/2014 | Nahill et al. |
| 2014/0071840 A1 | 3/2014 | Venancio |
| 2014/0074746 A1 | 3/2014 | Wang |
| 2014/0076974 A1 | 3/2014 | Havens et al. |
| 2014/0078341 A1 | 3/2014 | Havens et al. |
| 2014/0078342 A1 | 3/2014 | Li et al. |
| 2014/0078345 A1 | 3/2014 | Showering |
| 2014/0098792 A1 | 4/2014 | Wang et al. |
| 2014/0100774 A1 | 4/2014 | Showering |
| 2014/0100813 A1 | 4/2014 | Showering |
| 2014/0103115 A1 | 4/2014 | Meier et al. |
| 2014/0104413 A1 | 4/2014 | McCloskey et al. |
| 2014/0104414 A1 | 4/2014 | McCloskey et al. |
| 2014/0104416 A1 | 4/2014 | Giordano et al. |
| 2014/0104451 A1 | 4/2014 | Todeschini et al. |
| 2014/0106594 A1 | 4/2014 | Skvoretz |
| 2014/0106725 A1 | 4/2014 | Sauerwein |
| 2014/0108010 A1 | 4/2014 | Maltseff et al. |
| 2014/0108402 A1 | 4/2014 | Gomez et al. |
| 2014/0108682 A1 | 4/2014 | Caballero |
| 2014/0110485 A1 | 4/2014 | Toa et al. |
| 2014/0114530 A1 | 4/2014 | Fitch et al. |
| 2014/0124577 A1 | 5/2014 | Wang et al. |
| 2014/0124579 A1 | 5/2014 | Ding |
| 2014/0125842 A1 | 5/2014 | Winegar |
| 2014/0125853 A1 | 5/2014 | Wang |
| 2014/0125999 A1 | 5/2014 | Longacre et al. |
| 2014/0129378 A1 | 5/2014 | Richardson |
| 2014/0131438 A1 | 5/2014 | Kearney |
| 2014/0131441 A1 | 5/2014 | Nahill et al. |
| 2014/0131443 A1 | 5/2014 | Smith |
| 2014/0131444 A1 | 5/2014 | Wang |
| 2014/0131445 A1 | 5/2014 | Ding et al. |
| 2014/0131448 A1 | 5/2014 | Xian et al. |
| 2014/0133379 A1 | 5/2014 | Wang et al. |
| 2014/0136208 A1 | 5/2014 | Maltseff et al. |
| 2014/0140585 A1 | 5/2014 | Wang |
| 2014/0151453 A1 | 6/2014 | Meier et al. |
| 2014/0152882 A1 | 6/2014 | Samek et al. |
| 2014/0158770 A1 | 6/2014 | Sevier et al. |
| 2014/0159869 A1 | 6/2014 | Zumsteg et al. |

(56) References Cited

U.S. PATENT DOCUMENTS

| | | |
|---|---|---|
| 2014/0166755 A1 | 6/2014 | Liu et al. |
| 2014/0166757 A1 | 6/2014 | Smith |
| 2014/0166759 A1 | 6/2014 | Liu et al. |
| 2014/0168787 A1 | 6/2014 | Wang et al. |
| 2014/0175165 A1 | 6/2014 | Havens et al. |
| 2014/0175172 A1 | 6/2014 | Jovanovski et al. |
| 2014/0183263 A1 | 7/2014 | Chen et al. |
| 2014/0191644 A1 | 7/2014 | Chaney |
| 2014/0191913 A1 | 7/2014 | Ge et al. |
| 2014/0197238 A1 | 7/2014 | Liu et al. |
| 2014/0197239 A1 | 7/2014 | Havens et al. |
| 2014/0197304 A1 | 7/2014 | Feng et al. |
| 2014/0203087 A1 | 7/2014 | Smith et al. |
| 2014/0204268 A1 | 7/2014 | Grunow et al. |
| 2014/0214631 A1 | 7/2014 | Hansen |
| 2014/0217166 A1 | 8/2014 | Berthiaume et al. |
| 2014/0217180 A1 | 8/2014 | Liu |
| 2014/0231500 A1 | 8/2014 | Ehrhart et al. |
| 2014/0232930 A1 | 8/2014 | Anderson |
| 2014/0247315 A1 | 9/2014 | Marty et al. |
| 2014/0263493 A1 | 9/2014 | Amurgis et al. |
| 2014/0263645 A1 | 9/2014 | Smith et al. |
| 2014/0270196 A1 | 9/2014 | Braho et al. |
| 2014/0270229 A1 | 9/2014 | Braho |
| 2014/0278387 A1 | 9/2014 | DiGregorio |
| 2014/0282210 A1 | 9/2014 | Bianconi |
| 2014/0284384 A1 | 9/2014 | Lu et al. |
| 2014/0288933 A1 | 9/2014 | Braho et al. |
| 2014/0297058 A1 | 10/2014 | Barker et al. |
| 2014/0299665 A1 | 10/2014 | Barber et al. |
| 2014/0312121 A1 | 10/2014 | Lu et al. |
| 2014/0319220 A1 | 10/2014 | Coyle |
| 2014/0319221 A1 | 10/2014 | Oberpriller et al. |
| 2014/0326787 A1 | 11/2014 | Barten |
| 2014/0332590 A1 | 11/2014 | Wang et al. |
| 2014/0344943 A1 | 11/2014 | Todeschini et al. |
| 2014/0346233 A1 | 11/2014 | Liu et al. |
| 2014/0351317 A1 | 11/2014 | Smith et al. |
| 2014/0353373 A1 | 12/2014 | Van Horn et al. |
| 2014/0361073 A1 | 12/2014 | Qu et al. |
| 2014/0361082 A1 | 12/2014 | Xian et al. |
| 2014/0362184 A1 | 12/2014 | Jovanovski et al. |
| 2014/0363015 A1 | 12/2014 | Braho |
| 2014/0369511 A1 | 12/2014 | Sheerin et al. |
| 2014/0374483 A1 | 12/2014 | Lu |
| 2014/0374485 A1 | 12/2014 | Xian et al. |
| 2015/0001301 A1 | 1/2015 | Ouyang |
| 2015/0001304 A1 | 1/2015 | Todeschini |
| 2015/0003673 A1 | 1/2015 | Fletcher |
| 2015/0009338 A1 | 1/2015 | Laffargue et al. |
| 2015/0009610 A1 | 1/2015 | London et al. |
| 2015/0014416 A1 | 1/2015 | Kotlarsky et al. |
| 2015/0021397 A1 | 1/2015 | Rueblinger et al. |
| 2015/0028102 A1 | 1/2015 | Ren et al. |
| 2015/0028103 A1 | 1/2015 | Jiang |
| 2015/0028104 A1 | 1/2015 | Ma et al. |
| 2015/0029002 A1 | 1/2015 | Yeakley et al. |
| 2015/0032709 A1 | 1/2015 | Maloy et al. |
| 2015/0039309 A1 | 2/2015 | Braho et al. |
| 2015/0040378 A1 | 2/2015 | Saber et al. |
| 2015/0048168 A1 | 2/2015 | Fritz et al. |
| 2015/0049347 A1 | 2/2015 | Laffargue et al. |
| 2015/0051992 A1 | 2/2015 | Smith |
| 2015/0053766 A1 | 2/2015 | Havens et al. |
| 2015/0053768 A1 | 2/2015 | Wang et al. |
| 2015/0053769 A1 | 2/2015 | Thuries et al. |
| 2015/0062366 A1 | 3/2015 | Liu et al. |
| 2015/0063215 A1 | 3/2015 | Wang |
| 2015/0063676 A1 | 3/2015 | Lloyd et al. |
| 2015/0069130 A1 | 3/2015 | Gannon |
| 2015/0071819 A1 | 3/2015 | Todeschini |
| 2015/0083800 A1 | 3/2015 | Li et al. |
| 2015/0086114 A1 | 3/2015 | Todeschini |
| 2015/0088522 A1 | 3/2015 | Hendrickson et al. |
| 2015/0096872 A1 | 4/2015 | Woodburn |
| 2015/0099557 A1 | 4/2015 | Pettinelli et al. |
| 2015/0100196 A1 | 4/2015 | Hollifield |
| 2015/0102109 A1 | 4/2015 | Huck |
| 2015/0115035 A1 | 4/2015 | Meier et al. |
| 2015/0127791 A1 | 5/2015 | Kosecki et al. |
| 2015/0128116 A1 | 5/2015 | Chen et al. |
| 2015/0129659 A1 | 5/2015 | Feng et al. |
| 2015/0133047 A1 | 5/2015 | Smith et al. |
| 2015/0134470 A1 | 5/2015 | Hejl et al. |
| 2015/0136851 A1 | 5/2015 | Harding et al. |
| 2015/0136854 A1 | 5/2015 | Lu et al. |
| 2015/0142492 A1 | 5/2015 | Kumar |
| 2015/0144692 A1 | 5/2015 | Hejl |
| 2015/0144698 A1 | 5/2015 | Teng et al. |
| 2015/0144701 A1 | 5/2015 | Xian et al. |
| 2015/0149946 A1 | 5/2015 | Benos et al. |
| 2015/0161429 A1 | 6/2015 | Xian |
| 2015/0169925 A1 | 6/2015 | Chen et al. |
| 2015/0169929 A1 | 6/2015 | Williams et al. |
| 2015/0186703 A1 | 7/2015 | Chen et al. |
| 2015/0193644 A1 | 7/2015 | Kearney et al. |
| 2015/0193645 A1 | 7/2015 | Colavito et al. |
| 2015/0199957 A1 | 7/2015 | Funyak et al. |
| 2015/0204671 A1 | 7/2015 | Showering |

FOREIGN PATENT DOCUMENTS

| | | |
|---|---|---|
| WO | 2014019130 A1 | 2/2014 |
| WO | 2014110495 A1 | 7/2014 |

OTHER PUBLICATIONS

U.S. Appl. No. 14/264,173 for Autofocus Lens System for Indicia Readers filed Apr. 29, 2014, (Ackley et al.); 39 pages.

U.S. Appl. No. 14/453,019 for Dimensioning System With Guided Alignment, filed Aug. 6, 2014 (Li et al.); 31 pages.

U.S. Appl. No. 14/452,697 for Interactive Indicia Reader , filed Aug. 6, 2014, (Todeschini); 32 pages.

U.S. Appl. No. 14/231,898 for Hand-Mounted Indicia-Reading Device with Finger Motion Triggering filed Apr. 1, 2014 (Van Horn et al.); 36 pages.

U.S. Appl. No. 14/715,916 for Evaluating Image Values filed May 19, 2015 (Ackley); 60 pages.

U.S. Appl. No. 14/513,808 for Identifying Inventory Items in a Storage Facility filed Oct. 14, 2014 (Singel et al.); 51 pages.

U.S. Appl. No. 29/458,405 for an Electronic Device, filed Jun. 19, 2013 (Fitch et al.); 22 pages.

U.S. Appl. No. 29/459,620 for an Electronic Device Enclosure, filed Jul. 2, 2013 (London et al.); 21 pages.

U.S. Appl. No. 14/483,056 for Variable Depth of Field Barcode Scanner filed Sep. 10, 2014 (McCloskey et al.); 29 pages.

U.S. Appl. No. 14/531,154 for Directing an Inspector Through an Inspection filed Nov. 3, 2014 (Miller et al.); 53 pages.

U.S. Appl. No. 29/525,068 for Tablet Computer With Removable Scanning Device filed Apr. 27, 2015 (Schulte et al.); 19 pages.

U.S. Appl. No. 29/468,118 for an Electronic Device Case, filed Sep. 26, 2013 (Oberpriller et al.); 44 pages.

U.S. Appl. No. 14/340,627 for an Axially Reinforced Flexible Scan Element, filed Jul. 25, 2014 (Reublinger et al.); 41 pages.

U.S. Appl. No. 14/676,327 for Device Management Proxy for Secure Devices filed Apr. 1, 2015 (Yeakley et al.); 50 pages.

U.S. Appl. No. 14/257,364 for Docking System and Method Using Near Field Communication filed Apr. 21, 2014 (Showering); 31 pages.

U.S. Appl. No. 14/327,827 for a Mobile-Phone Adapter for Electronic Transactions, filed Jul. 10, 2014 (Hejl); 25 pages.

U.S. Appl. No. 14/334,934 for a System and Method for Indicia Verification, filed Jul. 18, 2014 (Hejl); 38 pages.

U.S. Appl. No. 29/530,600 for Cyclone filed Jun. 18, 2015 (Vargo et al); 16 pages.

U.S. Appl. No. 14/707,123 for Application Independent DEX/UCS Interface filed May 8, 2015 (Pape); 47 pages.

U.S. Appl. No. 14/283,282 for Terminal Having Illumination and Focus Control filed May 21, 2014 (Liu et al.); 31 pages.

(56) References Cited

OTHER PUBLICATIONS

U.S. Appl. No. 14/619,093 for Methods for Training a Speech Recognition System filed Feb. 11, 2015 (Pecorari); 35 pages.
U.S. Appl. No. 29/524,186 for Scanner filed Apr. 17, 2015 (Zhou et al.); 17 pages.
U.S. Appl. No. 14/705,407 for Method and System to Protect Software-Based Network-Connected Devices From Advanced Persistent Threat filed May 6, 2015 (Hussey et al.); 42 pages.
U.S. Appl. No. 14/614,706 for Device for Supporting an Electronic Tool on a User'S Hand filed Feb. 5, 2015 (Oberpriller et al.); 33 pages.
U.S. Appl. No. 14/628,708 for Device, System, and Method for Determining the Status of Checkout Lanes filed Feb. 23, 2015 (Todeschini); 37 pages.
U.S. Appl. No. 14/704,050 for Intermediate Linear Positioning filed May 5, 2015 (Charpentier et al.); 60 pages.
U.S. Appl. No. 14/529,563 for Adaptable Interface for a Mobile Computing Device filed Oct. 31, 2014 (Schoon et al.); 36 pages.
U.S. Appl. No. 14/705,012 for Hands-Free Human Machine Interface Responsive to a Driver of a Vehicle filed May 6, 2015 (Fitch et al.); 44 pages.
U.S. Appl. No. 14/715,672 for Augumented Reality Enabled Hazard Display filed May 19, 2015 (Venkatesha et al.); 35 pages.
U.S. Appl. No. 14/695,364 for Medication Management System filed Apr. 24, 2015 (Sewell et al.); 44 pages.
U.S. Appl. No. 14/664,063 for Method and Application for Scanning a Barcode With a Smart Device While Continuously Running and Displaying an Application on the Smart Device Display filed Mar. 20, 2015 (Todeschini); 37 pages.
U.S. Appl. No. 14/735,717 for Indicia-Reading Systems Having an Interface With a User'S Nervous System filed Jun. 10, 2015 (Todeschini); 39 pages.
U.S. Appl. No. 14/527,191 for Method and System for Recognizing Speech Using Wildcards in an Expected Response filed Oct. 29, 2014 (Braho et al.); 45 pages.
U.S. Appl. No. 14/702,110 for System and Method for Regulating Barcode Data Injection Into a Running Application on a Smart Device filed May 1, 2015 (Todeschini et al.); 38 pages.
U.S. Appl. No. 14/535,764 for Concatenated Expected Responses for Speech Recognition filed Nov. 7, 2014 (Braho et al.); 51 pages.
U.S. Appl. No. 14/687,289 for System for Communication via a Peripheral Hub filed Apr. 15, 2015 (Kohtz et al.); 37 pages.
U.S. Appl. No. 14/747,197 for Optical Pattern Projector filed Jun. 23, 2015 (Thuries et al.); 33 pages.
U.S. Appl. No. 14/674,329 for Aimer for Barcode Scanning filed Mar. 31, 2015 (Bidwell); 36 pages.
U.S. Appl. No. 14/702,979 for Tracking Battery Conditions filed May 4, 2015 (Young et al.); 70 pages.
U.S. Appl. No. 29/529,441 for Indicia Reading Device filed Jun. 8, 2015 (Zhou et al.); 14 pages.
U.S. Appl. No. 14/747,490 for Dual-Projector Three-Dimensional Scanner filed Jun. 23, 2015 (Jovanovski et al.); 40 pages.
U.S. Appl. No. 14/740,320 for Tactile Switch for a Mobile Electronic Device filed Jun. 16, 2015 (Barndringa); 38 pages.
U.S. Appl. No. 14/695,923 for Secure Unattended Network Authentication filed Apr. 24, 2015 (Kubler et al.); 52 pages.
U.S. Appl. No. 14/740,373 for Calibrating a Volume Dimensioner filed Jun. 16, 2015 (Ackley et al.); 63 pages.
U.S. Appl. No. 13/367,978, filed Feb. 7, 2012, (Feng et al.); now abandoned.
U.S. Appl. No. 14/462,801 for Mobile Computing Device With Data Cognition Software, filed Aug. 19, 2014 (Todeschini et al.); 38 pages.

U.S. Appl. No. 14/596,757 for System and Method for Detecting Barcode Printing Errors filed Jan. 14, 2015 (Ackley); 41 pages.
U.S. Appl. No. 14/277,337 for Multipurpose Optical Reader, filed May 14, 2014 (Jovanovski et al.); 59 pages.
U.S. Appl. No. 14/200,405 for Indicia Reader for Size-Limited Applications filed Mar. 7, 2014 (Feng et al.); 42 pages.
U.S. Appl. No. 14/662,922 for Multifunction Point of Sale System filed Mar. 19, 2015 (Van Horn et al.); 41 pages.
U.S. Appl. No. 14/446,391 for Multifunction Point of Sale Apparatus With Optical Signature Capture filed Jul. 30, 2014 (Good et al.); 37 pages.
U.S. Appl. No. 29/528,165 for In-Counter Barcode Scanner filed May 27, 2015 (Oberpriller et al.); 13 pages.
U.S. Appl. No. 29/528,890 for Mobile Computer Housing filed Jun. 2, 2015 (Fitch et al.); 61 pages.
U.S. Appl. No. 14/614,796 for Cargo Apportionment Techniques filed Feb. 5, 2015 (Morton et al.); 56 pages.
U.S. Appl. No. 29/516,892 for Table Computer filed Feb. 6, 2015 (Bidwell et al.); 13 pages.
U.S. Appl. No. 29/523,098 for Handle for a Tablet Computer filed Apr. 7, 2015 (Bidwell et al.); 17 pages.
U.S. Appl. No. 14/578,627 for Safety System and Method filed Dec. 22, 2014 (Ackley et al.); 32 pages.
U.S. Appl. No. 14/573,022 for Dynamic Diagnostic Indicator Generation filed Dec. 17, 2014 (Goldsmith); 43 pages.
U.S. Appl. No. 14/529,857 for Barcode Reader With Security Features filed Oct. 31, 2014 (Todeschini et al.); 32 pages.
U.S. Appl. No. 14/519,195 for Handheld Dimensioning System With Feedback filed Oct. 21, 2014 (Laffargue et al.); 39 pages.
U.S. Appl. No. 14/519,211 for System and Method for Dimensioning filed Oct. 21, 2014 (Ackley et al.); 33 pages.
U.S. Appl. No. 14/519,233 for Handheld Dimensioner With Data-Quality Indication filed Oct. 21, 2014 (Laffargue et al.); 36 pages.
U.S. Appl. No. 14/533,319 for Barcode Scanning System Using Wearable Device With Embedded Camera filed Nov. 5, 2014 (Todeschini); 29 pages.
U.S. Appl. No. 14/748,446 for Cordless Indicia Reader With a Multifunction Coil for Wireless Charging and EAS Deactivation, filed Jun. 24, 2015 (Xie et al.); 34 pages.
U.S. Appl. No. 29/528,590 for Electronic Device filed May 29, 2015 (Fitch et al.); 9 pages.
U.S. Appl. No. 14/519,249 for Handheld Dimensioning System With Measurement-Conformance Feedback filed Oct. 21, 2014 (Ackley et al.); 36 pages.
U.S. Appl. No. 29/519,017 for Scanner filed Mar. 2, 2015 (Zhou et al.); 11 pages.
U.S. Appl. No. 14/398,542 for Portable Electronic Devices Having a Separate Location Trigger Unit for Use in Controlling an Application Unit filed Nov. 3, 2014 (Bian et al.); 22 pages.
U.S. Appl. No. 14/405,278 for Design Pattern for Secure Store filed Mar. 9, 2015 (Zhu et al.); 23 pages.
U.S. Appl. No. 14/590,024 for Shelving and Package Locating Systems for Delivery Vehicles filed Jan. 6, 2015 (Payne); 31 pages.
U.S. Appl. No. 14/568,305 for Auto-Contrast Viewfinder for an Indicia Reader filed Dec. 12, 2014 (Todeschini); 29 pages.
U.S. Appl. No. 29/526,918 for Charging Base filed May 14, 2015 (Fitch et al.); 10 pages.
U.S. Appl. No. 14/580,262 for Media Gate for Thermal Transfer Printers filed Dec. 23, 2014 (Bowles); 36 pages.
European Extended Search Report in related Application No. 16164586.6, dated Sep. 9, 2016, 8 pages [Only new references cited: US 2006/0202036 was cited by examiner in current application].

* cited by examiner

CAPTURING A GRAPHIC INFORMATION PRESENTATION

TECHNOLOGY FIELD

The present invention relates generally to accessing information. More specifically, an embodiment of the present disclosure relates to capturing a graphic information presentation.

BACKGROUND

Generally speaking, graphic media are very useful for presenting information to their viewers. For example, graphic data representations on printed and other media are in common use. Information represented graphically may be accessed by scanning their media to retrieve data stored therewith.

Scanners typically illuminate graphic data media while exposing a photosensor to capture light reflected therefrom. The captured light corresponds to an image taken of the graphic data representation. The taken image is processed to read the graphic data representation.

Data are represented in some graphic media using two dimensional (2D) geometric pattern arrays, such as bar code patterns ("barcodes"). Barcodes are used for presenting graphic data over a wide variety of commercial, consumer, logistic and industrial applications and in other fields.

Barcodes may be printed on a variety of media. For example, barcodes may be printed on labels for paper documents, products, parcels, tickets, coupons, stamps, scrip, etc. While useful in many applications, such printed media may sometimes at least border on legacy in others.

In other fields related to, e.g., identity, financial and security uses, barcodes may be encoded, transmitted, and rendered electronically with display screens associated with computers. Increasingly, such computers comprise portable or mobile computing and communicating devices ("mobile devices").

Scanner devices must thus be operable for accessing graphic data presented in the printed media, as well as for retrieving data presented on mobile device display components. The tasks involved in these respective operations differ. Moreover, these operating differences are by no means trivial.

Scanning printed media typically proceeds with illumination of the media by a light source of the scanner. However, display screens of mobile devices are typically self-lit and have reflective viewing surfaces. Light from scanner sources thus "washes out" (obscures) data presented therewith.

Some scanners suppress their illumination supply to prevent such wash outs and improve data retrieval from mobile device display screens. However, such scanners may lose access to data on printed media. Duplicating scanners to read different media would be clearly impracticable and costly.

Issues related to this dichotomy are typically approached with trade-offs in performance characteristics, such as achievable suitable image quality from each of various media. For example, printed media scan quality improvements may reduce image quality from scans of electronic displays.

Typically, scanners light sources illuminate scan targets for the same length of time that their shutters are open for capturing light reflected therefrom. As illumination and exposure durations are equal, light reflected from mobile device displays increases along with exposure.

To ameliorate such reflection, some scanners reduce their light source brightness to scan display screens by decreasing power fed thereto. While the power reduction boosts significance of self-lighting from the scan target displays, motion tolerance qualities of the scan are reduced.

Other conventional scanners are operable to expose a first image with the scanner illumination source activated. The exposed first image is processed to try to determine if a self-lit display is present. If so, the scanner discards the first image and disables its light source temporarily.

Upon disabling its light source, the scanner then exposes a second image, in which the illumination is provided solely with the self-lighting of the image target display. Such scans clearly consume time and processing devoted to the first image for identifying the scan target as a display.

More time and processing resources are then consumed in disabling the scanner light source, and reimaging the display scan target. Unfortunately, identifying the scan targets as displays is sometimes inaccurate, thus compounding inefficiencies that may already be apparent for some scanners.

Therefore, a need exists for capturing graphic information presented on self-lit displays as well as in printed media. A need also exists for capturing graphic information, whether presented on self-lit displays or in printed media, without requiring multiple image captures.

Further, sufficient motion tolerance is needed in scanning graphic information presented either on self-lit displays or in printed media. Moreover, graphic information presented either on self-lit displays or in printed media needs to be captured efficiently, quickly and economically.

Issues or approaches within this background section may, but not necessarily have, been conceived or pursued previously. Unless otherwise indicated to the contrary, it is not to be assumed that anything in this section corresponds to any alleged prior art merely by inclusion in this section.

SUMMARY

Accordingly, in one aspect, the present invention embraces capturing a graphic information presentation. Example embodiments relate to scanning graphic information presented on self-lit displays as well as in printed media. Graphic information presented on either self-lit displays or in printed media is thus captured with sufficient motion tolerance quality in a single image. Multiple image captures and related processing and latency, typical in some scanners, are thus largely obviated and efficiency, speed and economy relative thereto may thus be improved.

In an example embodiment, a method relates to capturing graphic information from scan targets, which may comprise electronic displays and/or print based graphic media. An example process for scanning a graphic medium scan target captures an image of the scan target over an exposure duration. An illumination of the scan target is actuated over an illumination duration, which is brief relative to the exposure duration. The illumination of the scan target is deactivated upon an expiration of the illumination duration. The capture of the image continues over a significant portion of the exposure duration, which persists after the expiration of the significantly briefer illumination duration.

In another example embodiment, a non-transitory computer readable storage medium comprises instructions for causing, controlling or programming performance of a scanning process, such as the process described in the previous paragraph.

A further embodiment relates to a system for scanning a graphic medium scan target. The scanner system comprises a sensor and/or detector component, such as an optical array of CCDs or other photosensitive imaging devices, and is operable, upon actuating an exposure, for capturing an image of the scan target over a duration of the exposure actuation.

The scanner system also comprises a light source component operable, upon actuating an illumination, for illuminating the scan target over an illumination duration. The illumination duration is very brief in relation to the exposure duration, which is significantly longer. Upon an expiration of the illumination duration, the illumination of the scan target is deactivated while the capturing the image thereof continues for a significant portion of the exposure duration, which persists upon the expiration of the much briefer illumination duration.

An exposure regulating component is operable for setting the exposure duration and for the actuating the exposure. An illumination regulating component is operable for setting the illumination duration time and for the actuating, and the deactivating, of the illumination.

A controller/director component is operable for exchanging data signals with the other system components. The controller/director exchanges data signals with the exposure regulator, with the sensor/detector, and the illumination regulator and, based on the data signals exchanged each therewith, for controlling and/or directing the scanning over the graphic media scan targets. The controller may comprise a microprocessor, a microcontroller, or a programmable logic device (PLD).

Further, the system may comprise a non-transitory computer readable storage medium, which stores instructions. The instructions cause, control or program performance of a scanning process. The scanning process may comprise capturing graphic information from scan targets comprising electronic displays and/or print based graphic media. The scanning process captures an image of the scan target over an exposure duration.

An illumination of the scan target is actuated over an illumination duration brief relative to the exposure duration. The illumination of the scan target is deactivated upon an expiration of the illumination duration. The capturing the image step continues over a significant portion of the exposure duration persisting after the expiration of the illumination duration.

In another aspect, the present invention embraces a method for capturing graphic data presented with a scan target, which is related to a printed medium and/or a self-lit electronic display. In an example embodiment, a duration and an intensity are fixed in relation to an illumination.

An image of the scan target is taken with the fixed illumination related duration and intensity over a first exposure duration, which comprises a positive multiple of the fixed illumination related duration. The taken image is evaluated in relation to a quality related characteristic thereof.

The exposure duration is adjusted relative to the first exposure duration. The taking of the image and the evaluation thereof is performed with the adjusted exposure duration until the evaluated quality related image characteristic at least equals a value of a quality related target.

Example embodiments also relate to a non-transitory computer readable storage medium, comprising instructions for causing a processor to perform the method, and to a scanner system operable for scanning graphic media according to the method.

The foregoing illustrative summary, as well as other example objectives and/or advantages of the invention, and the manner in which the same are accomplished, are further explained within the following detailed description and its accompanying drawings.

DETAILED DESCRIPTION OF EXAMPLE EMBODIMENTS

The present invention embraces capturing a graphic information presentation. Example embodiments are described in relation to scanning graphic information presented on self-lit displays as well as in printed media. Graphic information presented on either the self-lit displays or in the printed media is thus captured with a single image and good motion tolerance.

An example embodiment relates to a process for scanning a scan target related to electronic displays and/or print based graphic media. An example process is described for scanning a graphic medium scan target. An image of the scan target is captured over an exposure duration. An illumination of the scan target is actuated over an illumination duration brief relative to the exposure duration. The illumination of the scan target is deactivated upon an expiration of the illumination duration. The capturing the image step continues over a significant portion of the exposure duration, which persists after the expiration of the illumination duration.

Scanners capture images of scan targets to access graphic information presented therewith. Typically, the scanners capture the images by opening a shutter component and thus, exposing photosensitive components to light reflected from the scan targets. The scanners typically illuminate the scan targets using on-board light sources.

Typical scanners may activate their light sources to illuminate the scan targets while their shutters are open. The photosensitive components are thus exposed to the light reflected from the scan targets for the same time the shutter is open. The exposure time and the illumination time are the same in conventional scanners.

The equal exposure and illumination times typically suffice for accessing graphic information presented on printed media and a variety of other common or related graphic media. Much graphic information is also presented currently using electronic displays, such as those associated with computers. A growing trend in fact involves presenting graphic information on electronic displays associated with mobile computer devices.

Many electronic displays are self-lit. Self-lit displays are illuminated by their own on-board lighting sources. Electronic displays, moreover, may have surfaces somewhat more reflective than those of printed media.

With self-lit displays however, the typical exposure and illumination time equality may fail to access graphic information presentations in at least one significant aspect. For example, the on-board light sources of scanners may wash out graphic information presented on self-lit displays. This washing out effect may, in fact, be exacerbated by reflections of the scanner light from the reflective surfaces of some scan target displays.

Figure 1:
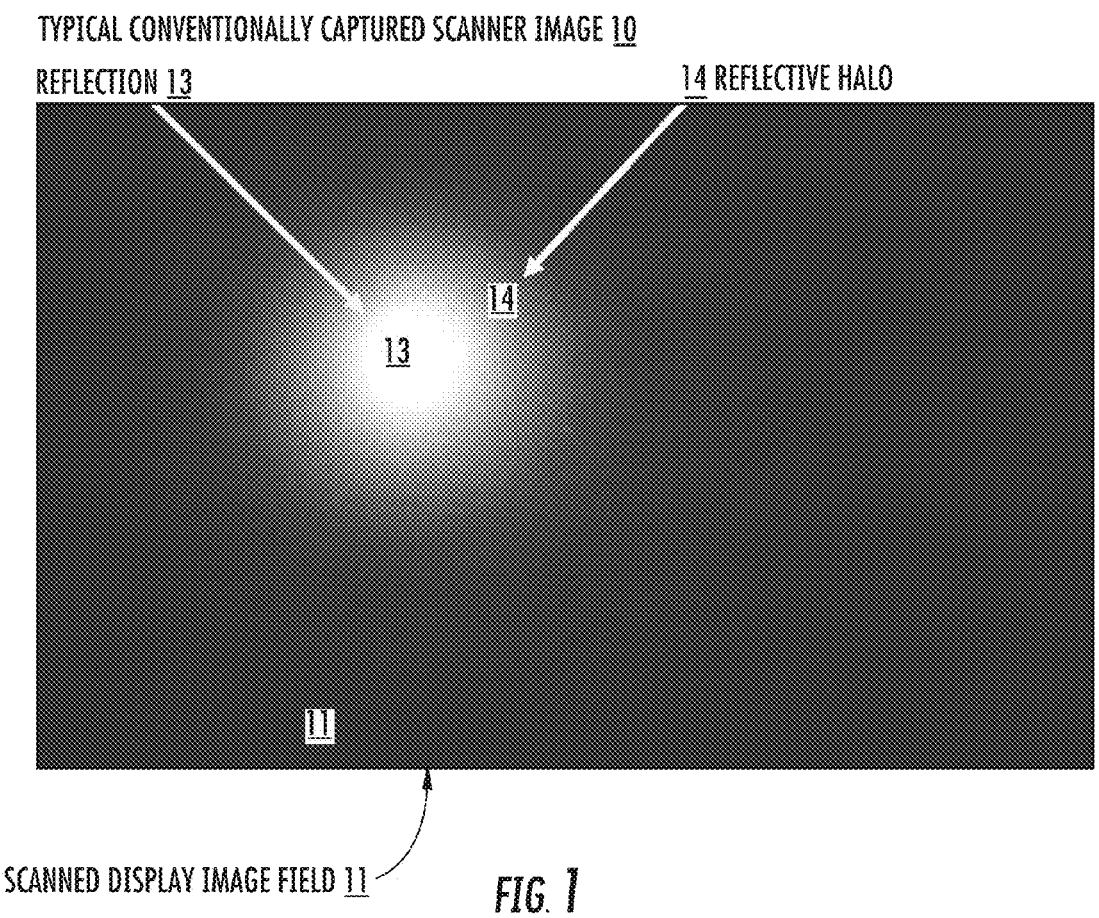
FIG. 1 depicts a typical effect of scanner lighting on an image of a computer screen captured by conventional means.

FIG. 1 depicts a typical effect of scanner lighting on an image 10 of a computer screen (e.g., captured by conventional means). While a bright reflection 13 of the scanner lighting is captured, surrounded by a somewhat more diffuse halo area 14, the typical equal exposure and illumination times provide no meaningful access to any useful graphic information. Instead, the bright scanner lighting has completely washed out any useful graphic information and beside the artifacts reflection 13 and halo 14 thereof, the captured display image 11 shows only a uniformly blackening.

A typical response of scanners faced with this situation may include temporary disabling their on-board light source and re-opening its shutter to expose its photosensitive components a second time. Subsequent captures of second (or more) images of scan targets may not be atypical.

The second image is captured using only self-lighting from a scanned display and/or ambient lighting that may be available, but without any illumination from the scanner's on-board light source. Typically, scanners may then essentially discard the first image 10, captured originally. While an adequate image may eventually thus be captured, this is typically achieved by consuming at least twice as much scan time, as well as more power and processing resources.

Example Process.

Figure 2:
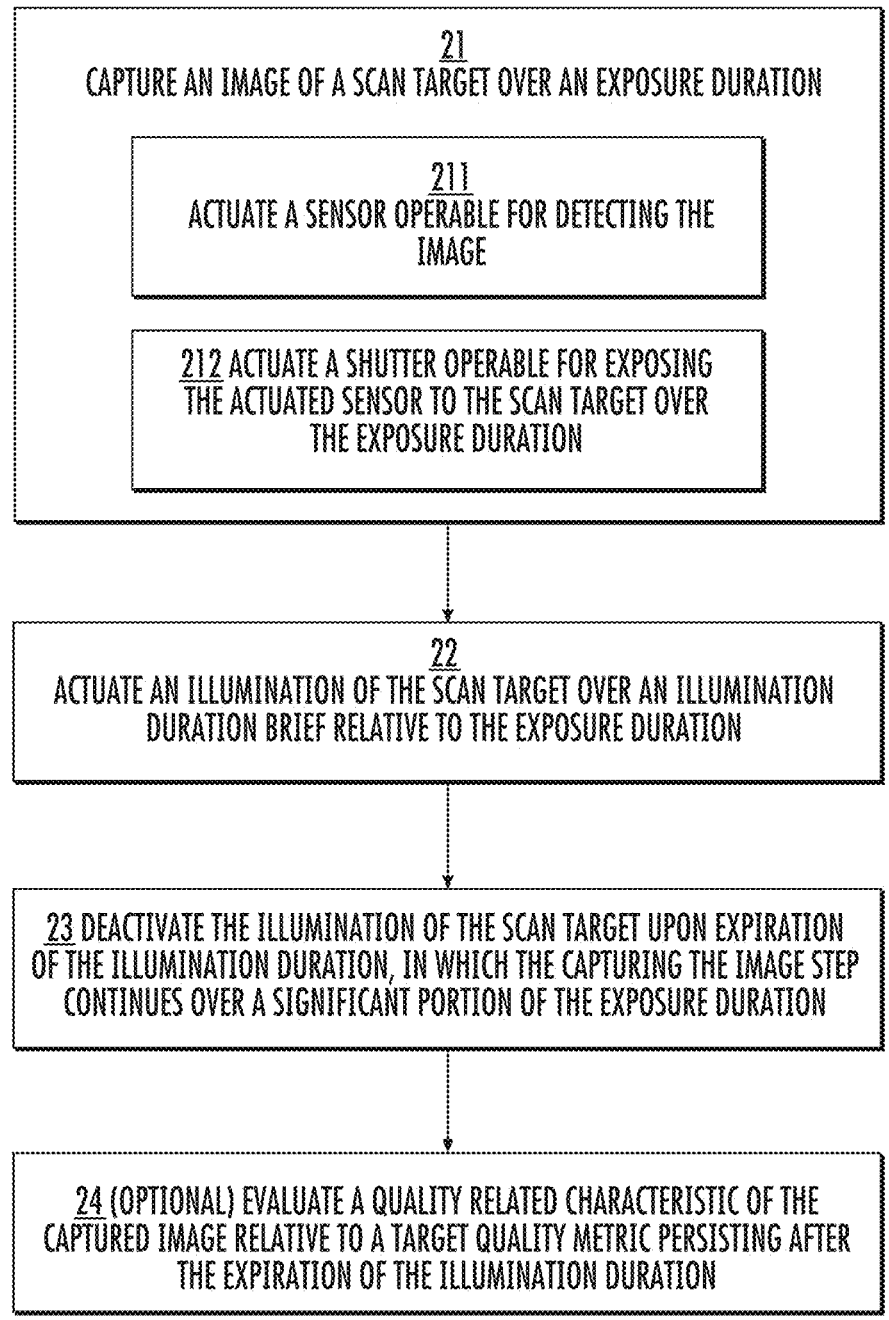
FIG. 2 depicts a flow chart for an example process for scanning information presented on a graphic medium, according to an example embodiment of the present invention.

In contrast to situations such as the scenarios discussed with reference to FIG. 1, example embodiments relate to scanning graphic information presented on self-lit displays as well as in printed media with a single image and good motion tolerance. FIG. 2 depicts a flow chart for an example process 20 for scanning information presented on a graphic display, according to an example embodiment of the present invention.

In process 20, scan targets related to electronic displays and/or print based graphic media are scanned. The graphic medium may comprise electronic displays, self-lit media, and/or print based media.

Self-lit electronic displays may be associated with computers, including portable, cellular, and mobile computing and communicating devices ("mobile devices"). The mobile devices may comprise "smart phones," tablet computers, Portable Data Terminals (PDTs), Personal Digital Assistants (PDAs) and other mobile or portable computer and communication devices.

In step 21, an image of the scan target is captured over an exposure duration. An example embodiment may be implemented in which the step 21 comprises a component step 211 and a component step 212.

The component step 211 comprises actuating a sensor operable for detecting the image. The component step 212 comprises actuating a shutter operable for exposing the actuated sensor to the scan target over the exposure duration.

In step 22, an illumination of the scan target is actuated over an illumination period, which is brief relative to the exposure duration. The exposure duration thus comprises a length of time that is significantly greater than a length of time corresponding to the illumination period.

In step 23, the illumination of the scan target is deactivated upon an expiration of the illumination duration. Importantly however, the capturing the image step '21' continues over at least a significant portion of the exposure duration, which persists after the expiration of the illumination duration.

The exposure duration is significantly longer than the illumination duration. For example, set illumination duration corresponds to a mere fraction of the exposure duration. The exposure duration corresponds to a significant multiple of the illumination duration.

An example embodiment may be implemented in which the illumination duration comprises a brief time period of around 200-400 microseconds (ms). During this brief time period, an example scanner actuates an on-board light source component with an electric current of about 300-700 Milliamps (mA).

The method 20 may also comprise one or more optional steps. For example, in a step 24, a quality related characteristic of the captured image may be evaluated relative to a target quality metric.

The quality related characteristic of the captured image and/or the target quality metric may comprise an image quality measurement. The image quality measurement may relate to a grey level, a saturation level, and/or a blackness level.

The image quality measurement of the captured image may be determined substantially globally over the captured image. Alternatively or additionally, the image quality measurement of the captured image may be determined locally in relation to at least a portion of the image.

A determination may be made based on the based on the evaluating step that the quality related characteristic of the captured image does not at least meet the target quality value.

In this case, the captured image may comprise a first captured image and the exposure duration may be increased to one or more increased exposure duration values. An example embodiment may be implemented in which adjustments to the exposure duration are computed according to an automatic exposure control (AEC) process and/or using values stored in firmware or other non-transitory computer readable storage media.

For example, the AEC process may manage the exposure duration according to the quality related evaluation of the received image. An example embodiment may be implemented in which, if a quality characteristic of an evaluated image is assessed as being excessively saturated relative to a saturation related quality metric (e.g., "target"), then the AEC may reduce the exposure duration. For example, the AEC may adjust the present exposure duration to a first adjusted exposure duration, which is lower than the present (unadjusted) duration.

On the other hand, if a quality characteristic of an evaluated image is assessed as being "black," or otherwise excessively dark relative to the saturation related quality metric or a black level related quality metric target, then the AEC may increase the exposure duration. For example, the AEC may adjust the present exposure duration to a second adjusted exposure duration, which is greater than the present (unadjusted) duration.

Continuing with this example, if the evaluated image is assessed as not saturated and not black (or otherwise too dark), a situation may arise in which its quality characteristic is assessed to not at least meet a target quality metric related to a grey scale or another quality metric. In this case, the AEC may adjust the exposure duration accordingly to a third adjusted exposure duration, which is directed to improving the image quality characteristic relative to the target quality metric. Table 1 below presents an example.

Table 1

If image is saturated, then reduce the exposure duration;
Else, if the image is black, then raise the exposure duration; or
Else (if the image is NOT saturated AND NOT black), then reset exposure duration to improve another image quality characteristic relative to corresponding target quality metric.

The capturing, actuating and deactivation steps '21' through '23' may then be repeated iteratively over the one or more increased exposure duration values and one or more subsequent corresponding images may thus be captured.

The evaluating the quality related characteristic step '24' may then also be repeated iteratively over the one or more subsequent captured images. The reiterated steps may continue to be performed until the quality related characteristic of at least one of the subsequent corresponding evaluated captured images at least meets the target quality value.

If none of the captured images meets the target quality value however upon reaching a maximum increased exposure duration, then an evaluated image having the quality value that most closely approximates the target quality value may be selected, used, stored, exported and/or processed, etc.

The set illumination duration may also comprise a first set time duration. Upon reaching the maximum increased exposure duration value, the illumination duration may be reset from the first set time duration to one or more increased illumination durations.

The capturing, actuating and deactivation steps '21' through '23' may then be repeated iteratively over the one or more increased illumination durations and one or more subsequent corresponding second images thus captured.

The evaluating the quality related characteristic step '24' may then also be repeated iteratively over the one or more subsequent captured second images until the quality related characteristic of at least one of the subsequent corresponding evaluated captured second images at least meets the target quality value.

If none of the captured images meets the target quality value however upon reaching a maximum increased illumination duration, then an evaluated image having the quality value that most closely approximates the target quality value may be selected, used, stored, exported and/or processed, etc.

The process 20 may be implemented using a scanner system and/or a computer and communication system platform (e.g., system 40, platform 80, described below with reference to FIG. 4 and FIG. 8, respectively).

Process 20 allows for capturing significant amounts of scanning information presented on a graphic display according to an example embodiment, as shown in FIG. 3.

Figure 3A:
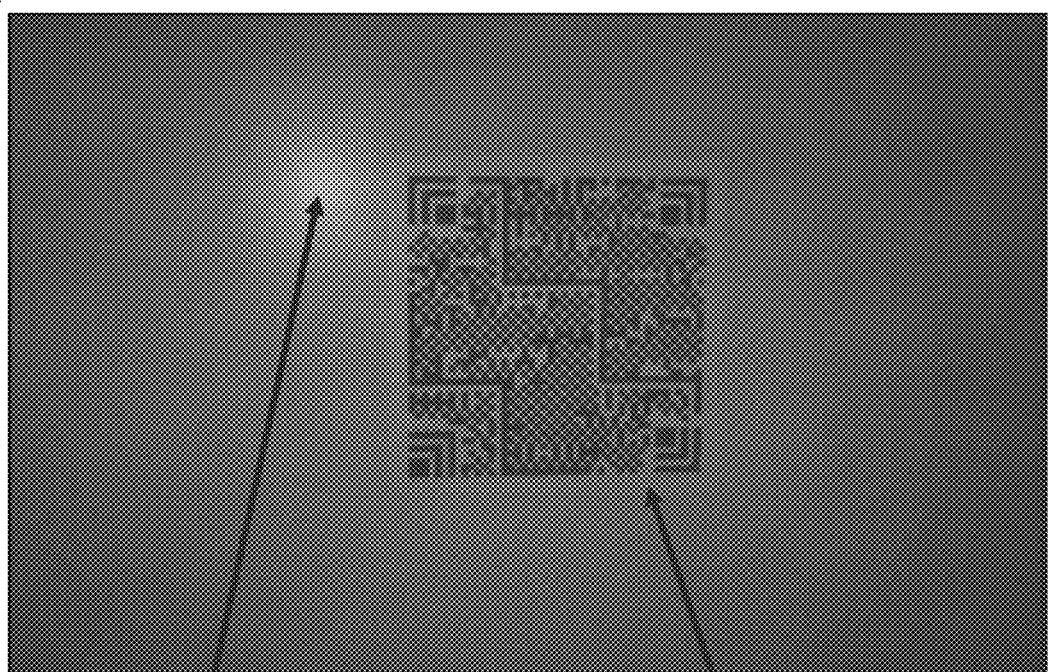
FIG. 3A and FIG. 3B each depict example images captured from a display screen, according to an example embodiment.
Figure 3B:
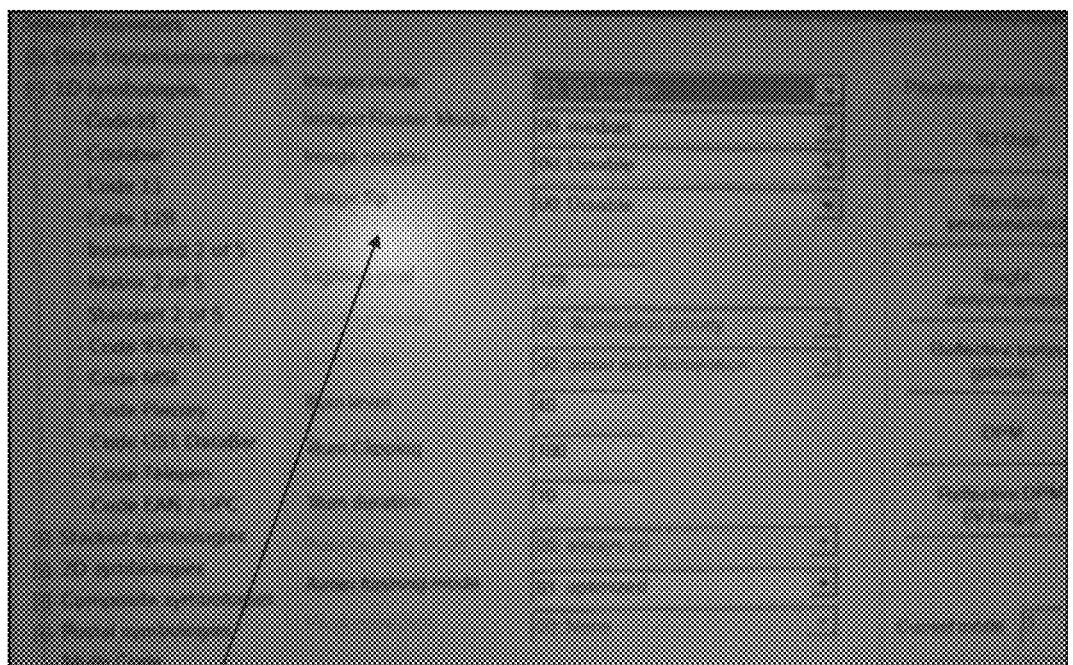

FIG. 3A and FIG. 3B each depict example images captured from a display screen, according to an example embodiment. The scanned display image field 31, as depicted in each of FIG. 3A and FIG. 3B, shows a significant amount of graphic information. The information shown in the image field 31 was captured from the scanned display screen with scanner illumination provided by a light pulse activated for a very short illumination duration. In FIG. 3A, the scanned display image field 31 comprises a representation of an example HanXin Code pattern 35, which is also intended to represent QR code patterns, dot code patterns and other formats used for presenting 2D graphic data in a matrix-like array, and any other bar codes or other 2D graphic data representations. In FIG. 3B, the scanned display image field 31 shows an interactive screen.

More particularly, the light pulse is deactivated at an early point in time during the exposure duration, which keeps the light pulse to an illumination duration significantly shorter than the exposure duration, which relates to the shutter speed or the time during which the shutter remains open.

In fact, the example image 30 depicts the same screen, which when scanned by conventional means produces the, blackened scanned display image field 11 washed out of useful graphic data (shown in FIG. 1). Illuminated by the ultra-short light pulse however, specifically a light pulse that is significantly shorter than (e.g., comprising a mere fraction of) the exposure duration during which the shutter is open to expose the image sensor, the image field 31 shows useful graphic information.

Indeed, an artifact 33 of the reflection ('13'; FIG. 1) may remain noticeable in the scanned display image field 31. However, the reflective artifact 33 is neither disruptive nor degrading to an image quality characteristic of the image field 31 sufficient to impair or deter an ability of decoding barcodes or other image features captured therewith. The reflective artifact 33 is in fact so diminished, relative to reflections caused conventionally, as to lack any appreciable associated halo artifact (e.g., halo '14'; FIG. 1).

Example Scanner System.

Figure 4:
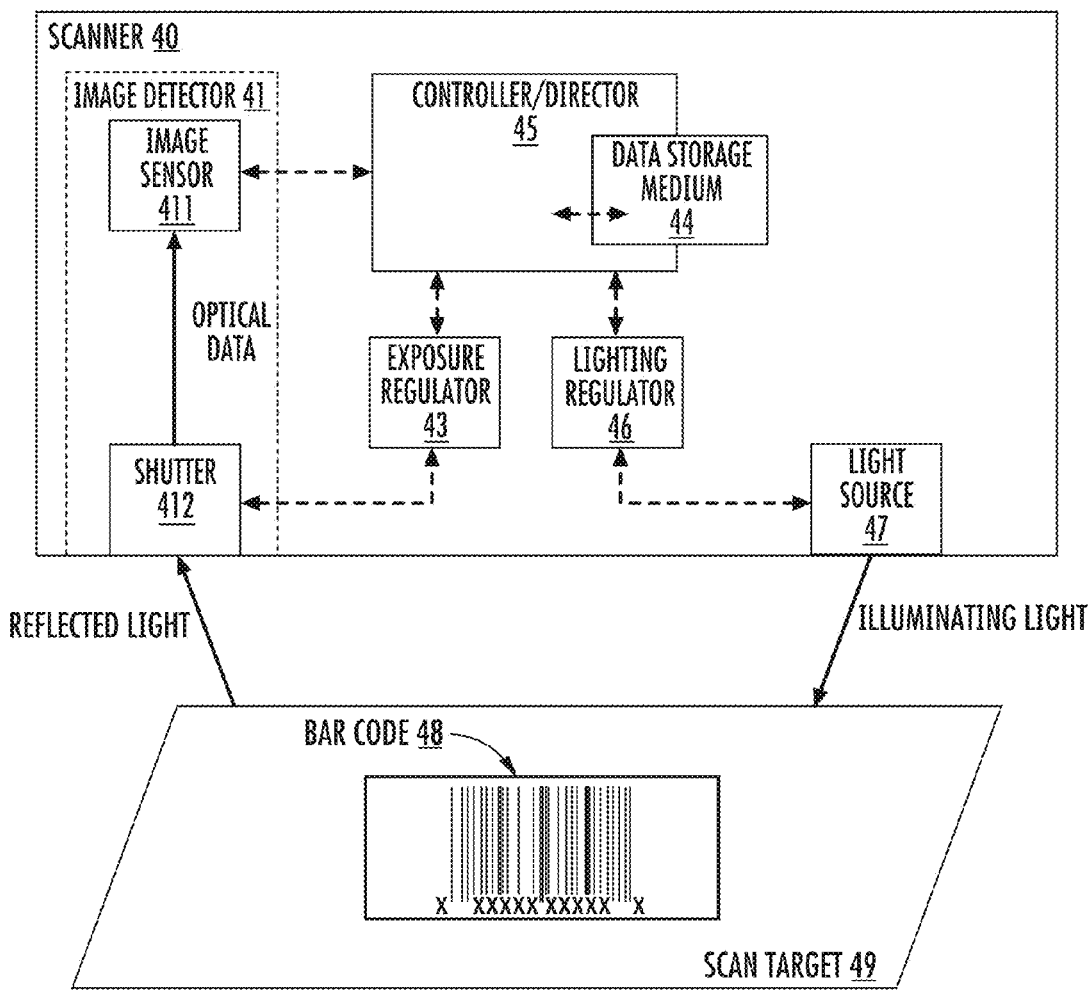
FIG. 4 depicts an example scanning system, according to an example embodiment.

FIG. 4 depicts an example scanning system 40, according to an example embodiment. The system 40 is operable for scanning a graphic medium scan target 49, such as a print related graphic medium or a self-lit display screen. The scan target 49 may present graphic information, such as a barcode 48.

FIG. 4 includes a key to symbols used therein. As shown in the key to symbols, pathways associated with direct and reflected lighting and corresponding optical data are represented with un-darkened single direction arrows. Darkened two-ended arrows represent bidirectional flow pathways, which correspond to data signals exchanged between components of the scanner system 40.

The scanner system 40 comprises an image detector component 41. The image detector 41 is operable, upon actuating an exposure, for capturing an image of the scan target 49 over a duration of the exposure actuation.

The detector component 41 may comprise an image sensor device 411 and a shutter device 412. The image sensor 411 is operable, upon the actuating the exposure, for the capturing the image of the scan target. The shutter 412 is operable for exposing the sensor device 411, upon the actuating the exposure.

An example embodiment may be implemented in which the sensor 411 comprises an optical array of photosensitive devices, such as an array of charged-coupled devices (CCD) or photodiodes. An example embodiment may also be implemented in which the shutter 412 is actuated electromechanically or electro-optically.

Electromechanical actuation may be achieved by opening the shutter 412. Electro-optical actuation may be achieved by rendering the shutter optically transparent. Electromechanical shutters may be deactivated by closing. Electro-optical shutters may be deactivated by rendering the shutter optically opaque, or at least reducing the optical transparence thereof significantly.

An example embodiment may also be implemented in which the detector 41 comprises optical components, devices or apparatus ("optics") for coupling the sensor 411 optically to light gathered by the scanner system 40 and admitted thereto through the open shutter 412. Such optics may be transmissive and/or reflective. Such optics may comprise various structures and/or combinations of lenses, prisms, mirrors, windows, filters, light guides and other optically transmissive media (e.g., optical fiber) and other optical components.

The scanner system 40 also comprises a light source component 47. The light source is operable, upon actuating an illumination, for illuminating the scan target 49 over an illumination duration. Importantly, the illumination duration is brief relative to the exposure duration.

Example embodiments may be implemented in which the light source provides illumination at a fixed light level. The light level may be fixed to a value stored in firmware.

Upon an expiration of the illumination duration, the light source 47 is also operable for deactivating, such as by "turning off" (or at least dimming substantially) and thus extinguishing its illumination operation. Importantly however, the sensor/detector 41 continues to operate for capturing the image of the scan target 49 during a remainder of the exposure duration, which persists for at least a significant (even substantial) time period after the expiration of the illumination duration.

Further, the scanner system 40 comprises an exposure regulator component 43 and a lighting (illumination) regulator component 46.

The exposure regulator 43 is operable for setting the exposure duration and for the actuating the exposure. The lighting regulator 46 is operable for setting the illumination duration and for the actuating, and the deactivating, the illumination operation of the light source 47.

The scanner system 40 comprises a controller/director component 45. The controller/director component 45 may comprise a microprocessor, a microcontroller, or a field programmable gate array (FPGA) or other programmable logic device (PLD).

The controller/director 45 is operable for exchanging data signals with the sensor/detector 41, the exposure regulator 43 and the lighting regulator 46. The controller/director 45 functions to control operations of the other components of the scanner system 40 with which it exchanges the data signals and thus, for directing the scanning of the graphic medium scan target 49.

The data signal exchange allows the controller/director 45 to effectively control the exposure regulating component 43 and the illumination regulating component 46 and thus, to set the illumination duration to a time period significantly shorter than the exposure duration.

The controller/director 45 may also be operable for evaluating a quality related characteristic of the captured image in relation to a target quality metric. The quality related characteristic of the captured image and/or the target quality metric may comprise a quality measurement related to a grey scale, a saturation level, and/or a blackness level.

The scanner system 40 may also comprise a non-transitory computer readable storage medium 44. The non-transitory computer readable storage medium 44 may be disposed, at least in part, separately in relation to the director/controller component 45 (e.g., as memory and/or drive components). The non-transitory computer readable storage medium 44 may also be integrated partially with at least a portion of the controller/director 45 (e.g., as registers and/or caches thereof).

The non-transitory computer readable storage medium 44 comprises instructions, which cause the controller/director component 45 to perform a scanning process over the scan target. The scan process comprises at least the capturing the image of the scan target over the exposure duration, the actuating the illumination of the scan target over the illumination duration, and the deactivating the illumination of the scan target upon the expiration of the illumination duration, in which the capturing the image step continues over the significant portion of the exposure duration, which persists after the expiration of the illumination duration.

The scan process may also may also comprise evaluating a quality related characteristic of the captured image may be evaluated relative to a target quality metric. The instructions may also cause the controller/director 45 to perform the process 20 (FIG. 2) and/or a process 70, which is described below (with reference to FIG. 7). One or more aspects or features of the system 40 may be implemented on a computer and communication system platform (e.g., computer and communication system platform 800), which is described below with reference to FIG. 8.

Setting the exposure duration and the illumination duration, adjusting the set exposure duration and/or illumination duration and/or evaluating quality related characteristics of captured images relative to quality targets may be computed according to an AEC algorithm and/or values stored in firmware. The computations may be performed or controlled based on instructions stored tangibly in non-transitory computer readable storage media.

With the scan target 49 presenting the barcode 48 within about 8-11 centimeters (cm) proximity to the scanner system 40, an example embodiment may be implemented in which the AEC sets the illumination duration for a brief time period (e.g., of around 200-400 ms). During this brief time period, the controller/director 45 and the lighting regulator 46 operate together for actuating the illumination by energizing the light source 47 with an electric current fixed at a value set in firmware (e.g., at approximately 300-700 mA).

As a position of the scan target 49 is displaced to another location further from the scanner system 40, the illumination provided by the light source 47 decreases by the square of the distance increase. At a distance of about 13-17 cm separation between the scanner system 40 and the scan target 49, ambient lighting in some settings may become more significant than the illumination remaining from the light source 47.

An example embodiment may be implemented in which AEC computations of the controller/director 45 thus cause its data signal exchange interaction with the exposure regulator for adjusting the exposure duration automatically to a longer time period. Even with scans performed over the increased exposure duration, example embodiments keep the illumination level of the light source fixed and its actuation current thus remains fixed at the original value.

Example embodiments may be implemented for scanning targets more than around 13-17 cm or more from the scanner in situations without sufficient ambient lighting. Such a situation is described below with reference to FIG. 7. In such situations, the exposure duration may reach an upper limit specified in firmware. In such situations, the AEC computations of the controller/director 45 thus cause its data signal exchange interaction with the illumination regulator for adjusting the illumination duration automatically to a longer time period. Notwithstanding any such increase to the illumination duration however, the exposure duration remains significantly longer.

Thus, even upon the adjustment of the illumination duration to an increased time period, the exposure duration continues for a significant portion of time remaining after its expiration. Moreover, even for scans performed over the increased exposure and illumination durations, example embodiments are implemented to keep the illumination level of the light source and its corresponding actuation current fixed at the value specified in firmware.

Figure 5:
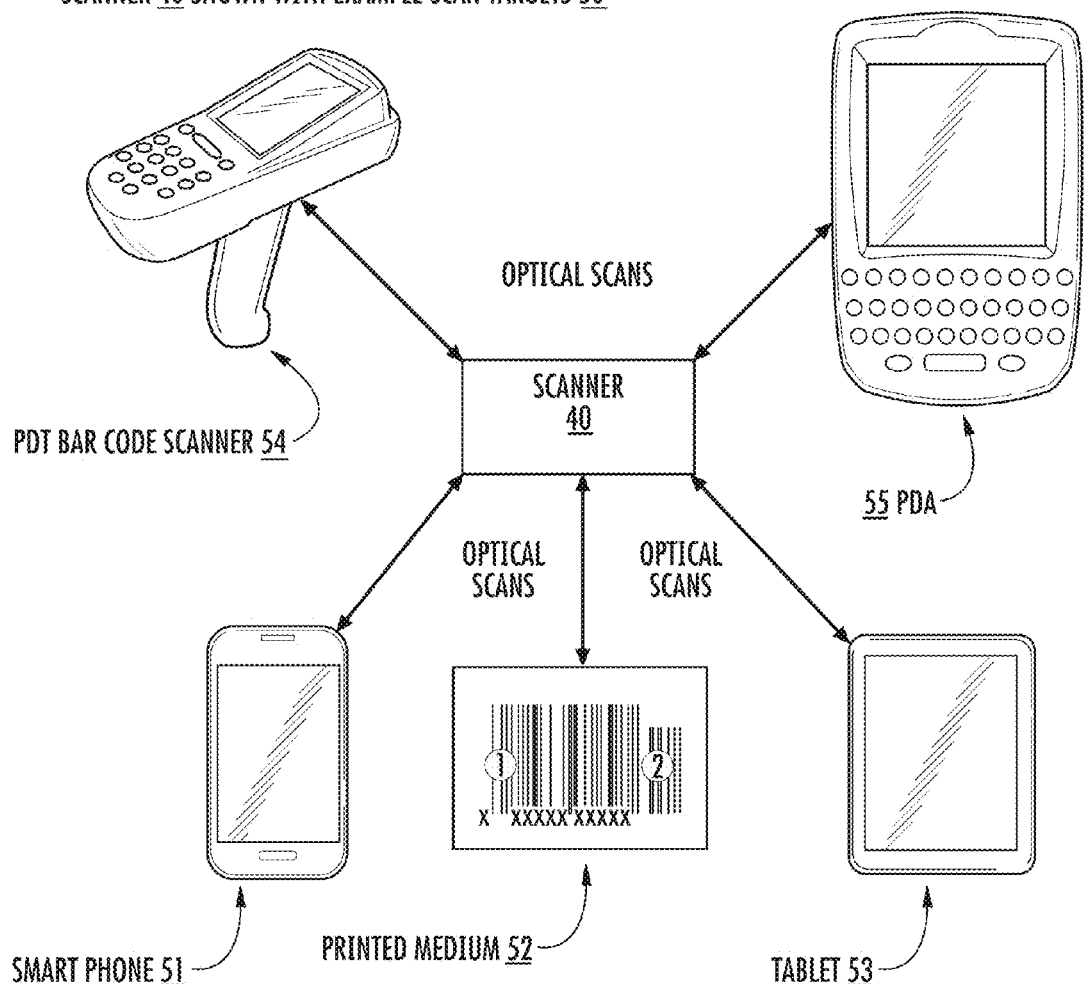
FIG. 5 depicts various example scan targets, according to an example embodiment.

The scanner system 40 is effective operationally for scanning optically scan targets comprising various graphic media. FIG. 5 depicts the scanner system 40 with a variety 50 of example scan targets, according to an example embodiment. The variety 50 of example scan targets comprises a printed medium 52, as well as several mobile devices, each with self-lit display screens.

The example mobile devices represented within the scan target variety 50 comprise a cellular "smart phone" type telephone and a tablet computer 53. The example mobile devices also comprise a barcode scanner PDT 54 and a PDA 55. The graphic media of the variety 50 are shown by way of example and should be considered representative, but not construed as limiting in any way.

The images presented by the scan target variety 50 may comprise two-dimensional (2D) geometric arrays of graphic data such as barcode patterns ("barcodes"). The barcodes may comprise Universal Product Code (UPC) patterns, HanXin Code Patterns, Quick-Read (QR) patterns, PDF417 (Portable Document File) patterns of four (4) vertical bar like symbols disposed over 17 horizontal spaces, and/or dot code patterns. Other kinds of graphic information, images and visual data may also be scanned by the system 40.

Figure 6:
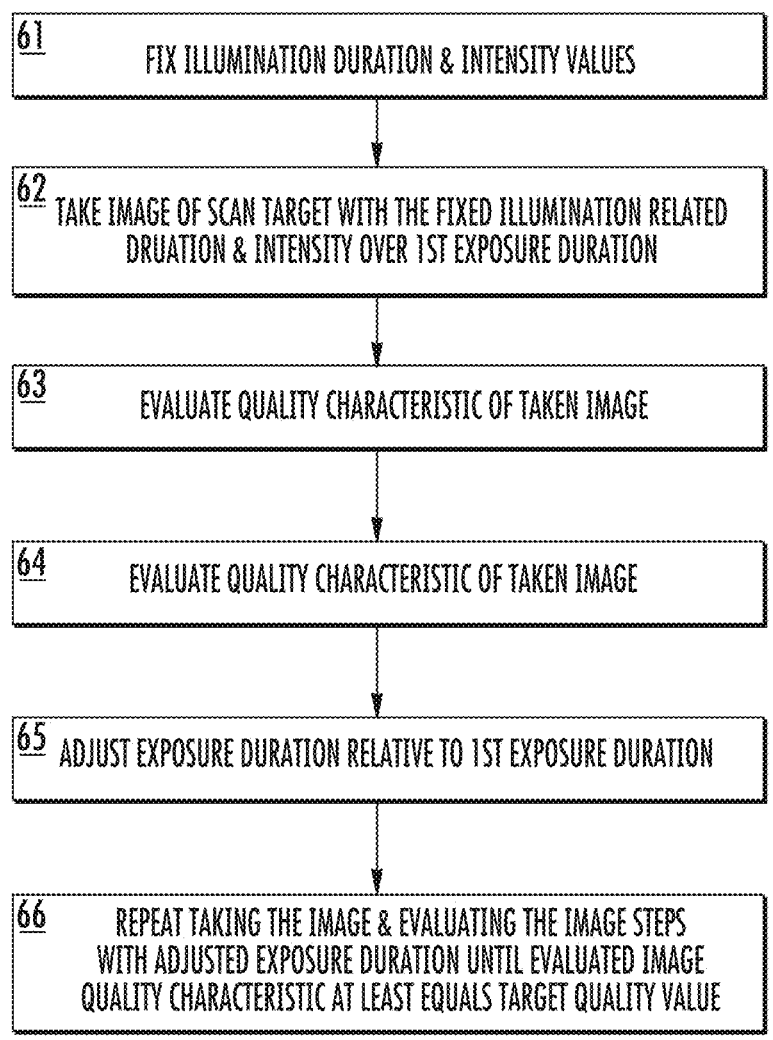
FIG. 6 depicts a flow chart for an example process for scanning information presented on a display screen, according to an example embodiment.

FIG. 6 depicts a flow chart for an example process 60 for scanning information presented by graphic media, according to an example embodiment. The process 60 begins with an example step 61.

In the step 61, a duration and an intensity are fixed in relation to an illumination. In step 62, an image of the scan target is taken with the fixed illumination related duration and intensity over a first exposure duration. The first exposure duration comprises a significant positive multiple of the fixed illumination related duration.

In step 63, the taken image is evaluated in relation to a quality related characteristic thereof. The evaluation may relate to a comparison of the quality related characteristic of the image to a specified "target" quality metric. The quality related image characteristic, the target quality metric and/or the corresponding evaluation and/or comparison may comprise quality measurements related to grey scales, saturation levels, and/or black levels.

In step 64, the exposure duration is adjusted relative to the first exposure duration and in step 65, the steps of taking the image and evaluating the image are repeated with the adjusted exposure duration until the evaluated quality related image characteristic at least equals a value of a quality related target.

The process 60 may comprise one or more optional steps. Upon the adjusting the exposure duration step '65' and the exposure duration reaching a maximum adjustment value for example, the process 60 may also comprise a step 66. In the step 66, a fixedness of the fixed illumination related duration is reset.

The illumination related duration may thus be adjusted to an adjusted illumination duration, which exceeds (is greater than) the fixed illumination related duration. The steps '62' and '63' of taking the image and evaluating the image, respectively, may then be repeated with (e.g., "at," "over," "using," "based on") the adjusted illumination duration until the evaluated quality related image characteristic at least meets (e.g., "equals," "reaches") the value of the quality related target.

Upon the repeating the steps of taking the image and evaluating the image with the adjusted illumination duration, in which the illumination duration reaches a maximum adjustment value but the evaluated quality related image characteristic fails to at least meet the value of the quality related target, an image having an evaluated quality related characteristic value closest to the quality related target may be processed, used, selected, accepted, etc.

The process 60 may be implemented using the scanner system 40, described above with reference to FIG. 4, and/or the computer and communication system platform 80, described below with reference to FIG. 8.

Example embodiments are operable for scanning some images in environmental areas illuminated by ambient lighting of relatively low levels. The illumination levels are low in relation to ambient light levels sufficient for illuminating print related graphic media and/or electronic displays (e.g., beyond an effective illumination range of self-lighting associated therewith).

Setting the exposure duration and the illumination duration, adjusting the set exposure duration and/or illumination duration and/or evaluating quality related characteristics of captured images relative to quality targets may be computed according to an AEC algorithm and/or values stored in firmware. The computations may be performed or controlled based on instructions stored tangibly in non-transitory computer readable storage media.

With scan targets within about 10 cm proximity to the scanners, example embodiments may be implemented in which an AEC sets the illumination duration for a brief time period. During this brief time period, illumination may be actuated by energizing a scanner on-board light source with an electric current fixed at a value set, e.g., in firmware.

As a position of the scan target is displaced to another location further from the scanner, the illumination provided by the on-board light source decreases by the square of the distance increase. At a distance of 15 cm separation between the scanner and the scan target, ambient lighting in some settings may become more significant than the illumination remaining from the scanner's on-board light source.

An example embodiment may be implemented in which AEC computations an automatic adjustment over the exposure duration to a longer time period. Even with scans performed over the increased exposure duration, example embodiments keep the illumination level of the light source fixed and its actuation current thus remains fixed.

Example embodiments may be implemented for scanning targets 15 cm or more from the scanner in situations without sufficient ambient lighting. Such a situation is described below with reference to FIG. 7. In such situations, the exposure duration may reach an upper limit, e.g., specified in firmware. In such situations, the AEC thus causes an adjustment of the illumination duration automatically to a longer time period. Notwithstanding any such increase to the illumination duration however, the exposure duration remains significantly longer in relation thereto.

Thus, even upon the adjustment of the illumination duration to an increased time period, the exposure duration continues for a significant portion of time remaining after its expiration. Moreover, even for scans performed over the increased exposure and illumination durations, example embodiments are implemented to keep the illumination level of the light source and its corresponding actuation current fixed at the value specified in firmware.

Figure 7:
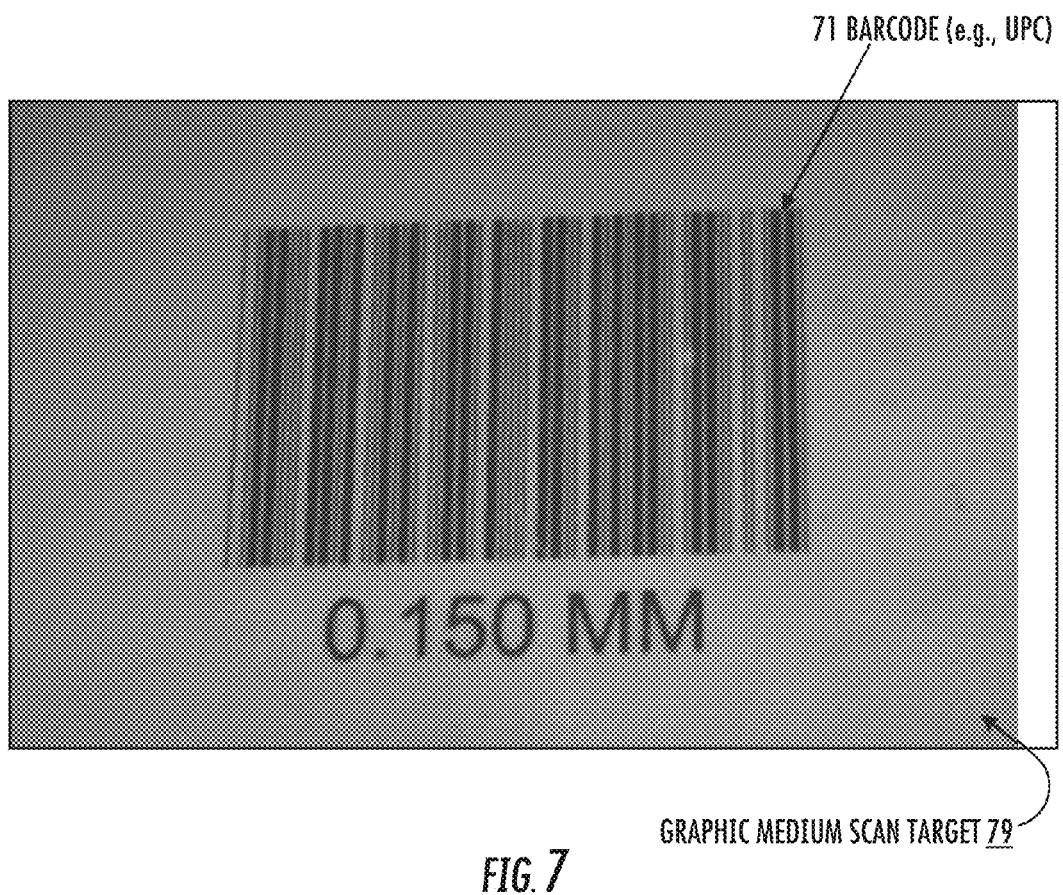
FIG. 7 depicts an example image of a barcode pattern captured from a printed medium, according to an example embodiment.

FIG. 7 depicts an example image 70 showing a barcode (e.g., UPC) pattern 71, captured from a printed medium 79, according to an example embodiment. The barcode 71 shown in the image 70 presents useful visual data, which allows effective access to graphic information encoded in the medium on which the barcode is printed. At scan time, the graphic medium scan target 79 on which the captured barcode 71 was presented is disposed in an area with the low ambient lighting level, as described above (e.g., "defined," "explained," etc. in the paragraph immediately preceding the present paragraph).

Moreover, the scan target 79 presenting the captured barcode 71 is imaged in the dark area (of low ambient lighting) according to an example embodiment as illuminated by a short light pulse. The short light pulse is activated over an illumination duration shorter than an exposure duration, over which the image 70 is captured. The short light pulse is also deactivated (e.g., "shut-off," "dimmed significantly," "extinguished," "deenergized," etc.) at an expiration (e.g., "termination") of the illumination duration.

The brief light pulse provided according to example embodiments may provide less light, overall, than the total amount of illumination provided by the relatively long light pulses provided typically by scanners (e.g., using "conventional" means). The difference may, in fact, be significant. However, the brief light pulse of example embodiments is sufficient for decoding the graphic data presented by the barcode 71, as captured in the scanned image 70. In this sense, the term "brief" is used herein relative to the corresponding significantly longer exposure duration and/or, to the longer light pulses typical of other (e.g., "conventional") scanners.

While the brief light pulse may suffice for decoding the barcode, and thus access graphic data presented by the image 70, augmentations may be helpful in some other situations. For example, if a symbol presented by a scan target was disposed at a locale farther away from the scanner (e.g., scanner 40; FIG. 4) than the proximity thereto of scan target 79, or the ambient light level of that locale is significantly darker in relation thereto (e.g., pitch-black) an example embodiment may be implemented to allow or enable full lighting on one or more subsequent scan attempt.

Setting the exposure duration and the illumination duration, adjusting the set exposure duration and/or illumination duration and/or evaluating quality related characteristics of captured images relative to quality targets may be computed according to an AEC algorithm and/or values stored in firmware. The computations may be performed or controlled based on instructions stored tangibly in non-transitory computer readable storage media.

With the scan target 70 presenting the barcode 71 within about 8-11 centimeters (cm) proximity to the scanner, an example embodiment may be implemented in which the AEC sets the illumination duration for a brief time period of around 300 ms. During this brief time period, the scanner's light source is energized by electric current fixed at a value set, e.g., in firmware.

As a position of the scan target 70 is displaced to another location further from the scanner, the illumination provided by its light source decreases by the square of the distance increase. At a distance of about 13-17 cm separation between the scan target 70 and the scanner, ambient lighting in some settings may become more significant than the illumination remaining from the light source.

An example embodiment may be implemented in which AEC computations cause adjustment of the exposure duration automatically to a longer time period. Even with scans performed over the increased exposure duration, example embodiments keep the illumination level of the light source fixed and its actuation current thus remains fixed.

Situations may arise however in which the ambient lighting is too low for sufficient illumination of the scan target 70. An example embodiment is implemented for scanning targets more than about 13-17 cm or more from the scanner in situations without sufficient ambient lighting. The image of the scan target 70 shown in FIG. 7 is captured in such a low ambient lighting milieu, wherein the exposure duration has reached an upper limit specified, e.g., in firmware.

In the situation shown in FIG. 7, AEC computations cause an adjustment to the illumination duration automatically to a longer time period. Notwithstanding any such increase to the illumination duration however, the exposure duration remains significantly longer.

Thus, even upon the adjustment of the illumination duration to an increased time period, the exposure duration continues for a significant portion of time remaining after its expiration. Moreover, even for scans performed over the increased exposure and illumination durations, example embodiments are implemented to keep the illumination level of the light source and its corresponding actuation current fixed at the value specified in firmware.

Example embodiments are thus described in relation to processes, and a system, for scanning a graphic medium scan target. An image of the scan target is captured over an exposure duration. An illumination of the scan target is actuated over an illumination duration brief relative to the exposure duration. The illumination of the scan target is deactivated upon an expiration of the illumination duration. The capturing the image step continues over a significant portion of the exposure duration persisting after the expiration of the illumination duration. The processes and systems described in relation to example embodiments may be implemented on a computer and communication network platform, such as that described below.

Example Computer and Communication Network Platform.

Figure 8:
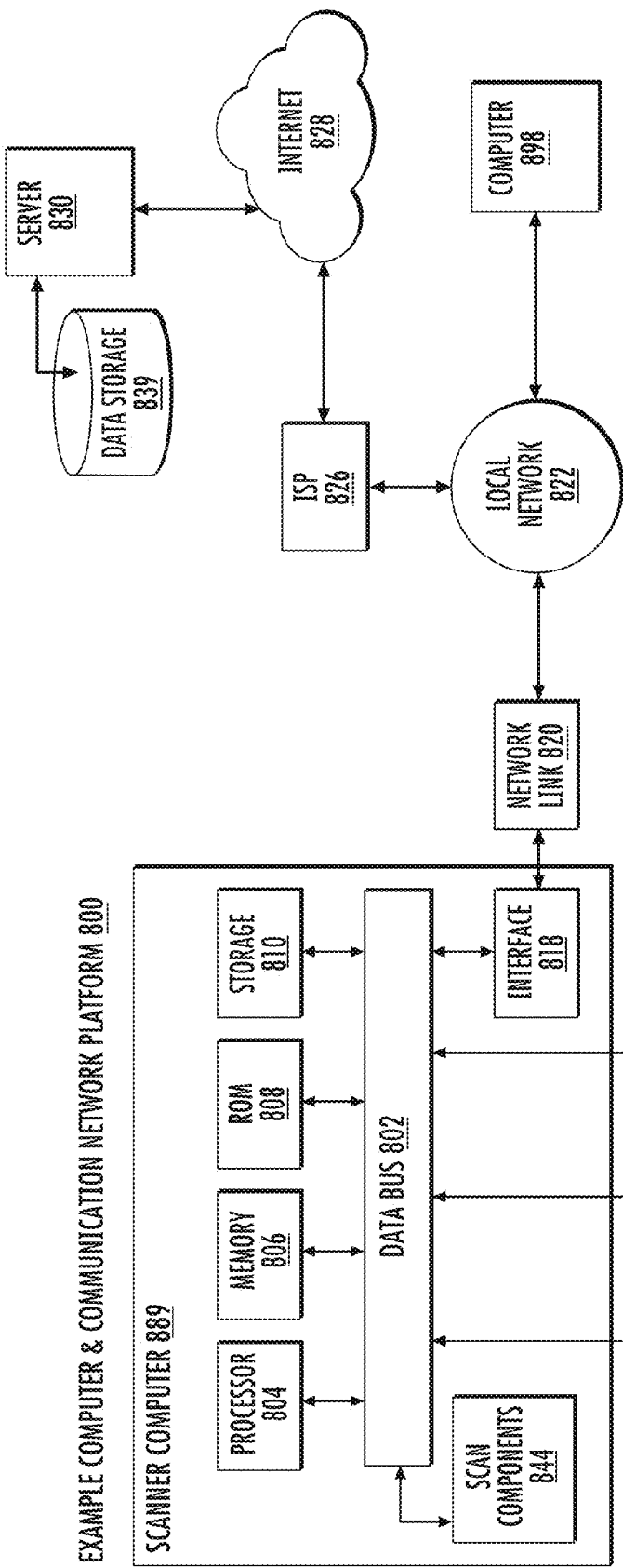
FIG. 8 depicts an example computer and network platform with which an example embodiment may be implemented.

FIG. 8 depicts an example computer and network platform 800, with which an example embodiment may be implemented. FIG. 8 depicts example computer and network platforms 800, with which an embodiment of the invention may be implemented. For example, the computer may comprise a scanner computer operable for exchanging data via communication networks, which may be represented at least in relation to some aspects thereof with reference to FIG. 8. The scanner computer 899 comprises scanner related components 844, which represents one or more features or components of a scanner system such as system 40 (FIG. 4).

Along with the scanner related components 844, the computer system 899 is operable for capturing graphic information from scan targets, which may comprise electronic displays and/or print based graphic media. Scanning the graphic medium captures an image or other aspects of such graphic information over an exposure duration. An illumination of the scan target is actuated over an illumination duration, which is brief relative to the exposure duration. The illumination of the scan target is deactivated upon an expiration of the illumination duration. The capture of the image continues over a significant portion of the exposure duration, which persists after the expiration of the significantly briefer illumination duration.

The scanner computer 899 comprises a data bus 802 or other communication mechanism for communicating information, and a processor 804 coupled with bus 802 for processing information. Computer 899 also includes a main memory 806, such as a random access memory (RAM) or other dynamic storage device, coupled to bus 802 for storing information and instructions to be executed by processor 804. Main memory 806 also may be used for storing temporary variables or other intermediate information during execution of instructions to be executed by processor 804.

Computer 899 further includes a read only memory (ROM) 808 or other static storage device coupled to bus 802 for storing static information and instructions for processor 804. A storage device 810, such as a magnetic disk, flash drive, or optical disk, is provided and coupled to bus 802 for storing information and instructions. Processor 804 may perform one or more digital signal processing (DSP) functions.

Additionally or alternatively, DSP functions may be performed by another processor or entity (represented herein with processor 804).

Computer 899 may be coupled via bus 802 to a display 812, such as a modern liquid crystal display (LCD). Older cathode ray tube (CRT) display types, plasma displays, "thin" (or "cold cathode") CRTs, and other displays and monitors may also be used for displaying information to a computer user. In some telephone, tablet, PDT and/or PDA applications, LCDs or thin CRTs may be used with some preference or regularity.

An input device 814, including alphanumeric (and/or ideographic, syllabary-related and/or other) symbols and other keys, is coupled to bus 802 for communicating information and command selections to processor 804. Another type of user input device comprises a cursor control 816. The cursor controller 816 may comprise a haptic-enabled "touch-screen" or "mouse pad" like GUI display, or a mouse, trackball, or cursor direction keys for communicating direction information and command selections to processor 804 and for controlling cursor movement on display 812.

Such input devices may typically allow or feature two degrees of freedom over at least two axes. The two axes comprise a first axis (e.g., 'x' or horizontal) and a second axis (e.g., 'y' or vertical), which allows the device to specify positions over a representation of a geometric plane. Some phones with simpler keyboards may implement this or a similar feature haptically using a touch-screen GUI display and/or with a set of directionally active "arrow" (or other direction-indicative) keys.

Embodiments of the present disclosure relate to the use of computer 899 for scanning visual data such as barcodes and/or other images presented on printed graphic media and/or self-lit electronic displays, and other embodiments described herein. This feature is provided, controlled, enabled or allowed with computer 899 functioning in response to processor 804 executing one or more sequences of one or more instructions contained in main memory 806 and/or other non-transitory computer readable storage media.

Such instructions may be read into main memory 806 from another computer-readable medium, such as storage device 810. Execution of the sequences of instructions contained in main memory 806 causes processor 804 to perform the process steps described herein. One or more processors in a multi-processing arrangement may also be employed to execute the sequences of instructions contained in main memory 806. In alternative embodiments, hard-wired circuitry may be used in place of or in combination with software instructions to implement the invention. Thus, embodiments of the invention are not limited to any specific combination of hardware, circuitry, firmware and/or software.

The term "computer readable storage medium," as used herein, may refer to any non-transitory storage medium that participates in providing instructions to processor 804 for execution. Such a medium may take many forms, including but not limited to, non-volatile media, volatile media, and transmission media. Non-volatile media includes, for example, optical or magnetic disks, such as storage device 810. Volatile media includes dynamic memory, such as main memory 806. Transmission media includes coaxial cables, copper wire and other electrical conductors and fiber optics, including the wires (and/or other conductors or optics) that comprise the data bus 802. Transmission media can also take the form of electromagnetic (e.g., light) waves, such as those generated during radio wave and infrared and other optical data communications (and acoustic, e.g., sound related, or other mechanical, vibrational, or phonon related transmissive media.

Common or familiar forms of non-transitory computer-readable storage media include, for example, flash drives such as may be accessible via USB (universal serial bus), "Firewire," or other connections, as well as legacy "floppy disks," flexible disks, hard drives and disks, legacy magnetic tape, and/or any other magnetic medium, CD-ROM, DVD and BD and other optically accessible or readable media, or even punch cards, paper tape, and other legacy or physically or mechanically media bearing patterns of holes or the like, RAM, PROM, EPROM, FLASH-EPROM, and/or any other memory chip or cartridge, carrier waves (as described hereinafter), or any other medium from which a computer can read data.

Various forms of non-transitory computer readable storage media may be involved in carrying one or more sequences of one or more instructions to processor 804 for execution. For example, the instructions may initially be carried on a magnetic or other disk of a remote computer (e.g., server 830). The remote computer can load the instructions into its dynamic memory and send the instructions over a telephone line and/or network, e.g., using a modem (modulator/demodulator).

A modem local to the computer 899 can receive the data over networks wirelessly and/or on wireline (e.g., coaxial cable, fiber optics, telephone lines, etc.) and use an infrared or other transmitter to convert the data to an infrared or other signal. An infrared or other detector coupled to bus 802 can receive the data carried in the infrared or other signal and place the data on bus 802. Bus 802 carries the data to main memory 806, from which processor 804 retrieves and executes the instructions. The instructions received by main memory 806 may optionally be stored on storage device 810 either before or after execution by processor 804.

Computer 899 also includes a communication interface 818 coupled to bus 802. Communication interface 818 provides a two-way (or more) data communication coupling to a network link 820 that is connected to a local network 822. For example, communication interface 818 may comprise a cable modem, an optical modem, or a DSL (digital subscription line), or even legacy media such as ISDN (integrated services digital network) cards, or other modem types, to provide a data communication connection to a corresponding type of telephone line or wireless medium. As another example, communication interface 818 may comprise a local area network (LAN) card to provide a data communication connection to a compatible LAN. Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) (or telephone switching center) 826. An example embodiment may be implemented in which the local network 822 comprises a communication medium (or multiple network media) with which a user's telephone or other data (and/or other) communication system may function. The ISP 826, in turn, provides data communication services over one or more wide area network (WANs) and internetworks, including the worldwide packet-switched data communication networks now commonly referred to as the "Internet" 828 and the "World-Wide Web" (www) associated and/or interconnected therewith, and/or using TCP/IP (Transmission Control Protocol/Internet Protocol) or other modalities with similar connectivity features and/or capabilities.

The local network 822 and WAN Internet 828 both use electrical, electromagnetic or optical signals that carry digital data streams. The signals through the various networks and the signals on network link 820 and through communication interface 818, which carry the digital data to and from computer 899, are exemplary forms of carrier waves transporting the information.

Computer 899 can send messages and receive data, including program code, through the network(s), network link 820 and communication interface 818.

In the Internet example, a server 830 might transmit a requested code for an application program related to logistics or other computations through Internet 828, ISP 826, local network 822 and communication interface 818. In an embodiment of the invention, one such downloaded application provides for scanning print related graphic media and self-lit electronic displays in relation to accessing visual, graphic and other information presented therewith.

The received code may be executed by processor 804 as it is received, and/or stored in storage device 810, or other non-volatile storage for later execution. In this manner, computer 899 may obtain application code in the form of a carrier wave.

Computer 899 thus gathers data from the database 839 and the scanner components 844 and directs the capture or other gathering of the graphic data presented therewith. An example embodiment may be implemented in which computer 899 gathers data from the database 839, the server 830, the scanner components 844 and/or the computer 898 via the WAN/Internet 828 local network 822 and the network link 820, etc. Data contained in barcodes and other graphic information captured from the scanned media targets may also be sent to the database 839 for storage and access by computer 898, later retrieval by the scanner computer 899 and/or other computers connected over any of the networks of the platform 800.

An example embodiment may also be implemented in which the computer 899 gathers data from the database 839 by means of queries directed via the server 830 and over the internet (or other network) 828, as well as the local network 822 and network link 820, etc.

Example embodiments of the present invention are thus described in relation to a process for scanning a graphic medium scan target. An image of the scan target is captured over an exposure duration. An illumination of the scan target is actuated over an illumination duration brief relative to the exposure duration. The illumination of the scan target is deactivated upon an expiration of the illumination duration. The capturing the image step continues over a significant portion of the exposure duration, which persists after the expiration of the illumination duration.

In the specification and/or figures, example embodiments of the invention have been described in relation to a process is described for scanning a scan target related to an electronic display or a print based graphic medium. An image of the scan target is captured over an exposure duration and with an illumination activated at a fixed lighting intensity level and for a set illumination duration. The set illumination duration corresponds to a mere fraction of the exposure duration. The illumination deactivates upon expiration of the illumination duration. A quality related characteristic of the captured image is evaluated relative to a target quality metric.

To supplement the present disclosure, this application incorporates entirely by reference the following patents, patent application publications, and patent applications:
U.S. Pat. No. 6,832,725; U.S. Pat. No. 7,128,266;
U.S. Pat. No. 7,159,783; U.S. Pat. No. 7,413,127;
U.S. Pat. No. 7,726,575; U.S. Pat. No. 8,294,969;
U.S. Pat. No. 8,317,105; U.S. Pat. No. 8,322,622;
U.S. Pat. No. 8,366,005; U.S. Pat. No. 8,371,507;
U.S. Pat. No. 8,376,233; U.S. Pat. No. 8,381,979;
U.S. Pat. No. 8,390,909; U.S. Pat. No. 8,408,464;
U.S. Pat. No. 8,408,468; U.S. Pat. No. 8,408,469;
U.S. Pat. No. 8,424,768; U.S. Pat. No. 8,448,863;
U.S. Pat. No. 8,457,013; U.S. Pat. No. 8,459,557;
U.S. Pat. No. 8,469,272; U.S. Pat. No. 8,474,712;
U.S. Pat. No. 8,479,992; U.S. Pat. No. 8,490,877;
U.S. Pat. No. 8,517,271; U.S. Pat. No. 8,523,076;
U.S. Pat. No. 8,528,818; U.S. Pat. No. 8,544,737;
U.S. Pat. No. 8,548,242; U.S. Pat. No. 8,548,420;
U.S. Pat. No. 8,550,335; U.S. Pat. No. 8,550,354;
U.S. Pat. No. 8,550,357; U.S. Pat. No. 8,556,174;
U.S. Pat. No. 8,556,176; U.S. Pat. No. 8,556,177;
U.S. Pat. No. 8,559,767; U.S. Pat. No. 8,599,957;
U.S. Pat. No. 8,561,895; U.S. Pat. No. 8,561,903;
U.S. Pat. No. 8,561,905; U.S. Pat. No. 8,565,107;
U.S. Pat. No. 8,571,307; U.S. Pat. No. 8,579,200;
U.S. Pat. No. 8,583,924; U.S. Pat. No. 8,584,945;
U.S. Pat. No. 8,587,595; U.S. Pat. No. 8,587,697;
U.S. Pat. No. 8,588,869; U.S. Pat. No. 8,590,789;
U.S. Pat. No. 8,596,539; U.S. Pat. No. 8,596,542;
U.S. Pat. No. 8,596,543; U.S. Pat. No. 8,599,271;
U.S. Pat. No. 8,599,957; U.S. Pat. No. 8,600,158;
U.S. Pat. No. 8,600,167; U.S. Pat. No. 8,602,309;
U.S. Pat. No. 8,608,053; U.S. Pat. No. 8,608,071;
U.S. Pat. No. 8,611,309; U.S. Pat. No. 8,615,487;
U.S. Pat. No. 8,616,454; U.S. Pat. No. 8,621,123;
U.S. Pat. No. 8,622,303; U.S. Pat. No. 8,628,013;
U.S. Pat. No. 8,628,015; U.S. Pat. No. 8,628,016;
U.S. Pat. No. 8,629,926; U.S. Pat. No. 8,630,491;
U.S. Pat. No. 8,635,309; U.S. Pat. No. 8,636,200;
U.S. Pat. No. 8,636,212; U.S. Pat. No. 8,636,215;
U.S. Pat. No. 8,636,224; U.S. Pat. No. 8,638,806;
U.S. Pat. No. 8,640,958; U.S. Pat. No. 8,640,960;

U.S. Pat. No. 8,643,717; U.S. Pat. No. 8,646,692;
U.S. Pat. No. 8,646,694; U.S. Pat. No. 8,657,200;
U.S. Pat. No. 8,659,397; U.S. Pat. No. 8,668,149;
U.S. Pat. No. 8,678,285; U.S. Pat. No. 8,678,286;
U.S. Pat. No. 8,682,077; U.S. Pat. No. 8,687,282;
U.S. Pat. No. 8,692,927; U.S. Pat. No. 8,695,880;
U.S. Pat. No. 8,698,949; U.S. Pat. No. 8,717,494;
U.S. Pat. No. 8,717,494; U.S. Pat. No. 8,720,783;
U.S. Pat. No. 8,723,804; U.S. Pat. No. 8,723,904;
U.S. Pat. No. 8,727,223; U.S. Pat. No. D702,237;
U.S. Pat. No. 8,740,082; U.S. Pat. No. 8,740,085;
U.S. Pat. No. 8,746,563; U.S. Pat. No. 8,750,445;
U.S. Pat. No. 8,752,766; U.S. Pat. No. 8,756,059;
U.S. Pat. No. 8,757,495; U.S. Pat. No. 8,760,563;
U.S. Pat. No. 8,763,909; U.S. Pat. No. 8,777,108;
U.S. Pat. No. 8,777,109; U.S. Pat. No. 8,779,898;
U.S. Pat. No. 8,781,520; U.S. Pat. No. 8,783,573;
U.S. Pat. No. 8,789,757; U.S. Pat. No. 8,789,758;
U.S. Pat. No. 8,789,759; U.S. Pat. No. 8,794,520;
U.S. Pat. No. 8,794,522; U.S. Pat. No. 8,794,526;
U.S. Pat. No. 8,798,367; U.S. Pat. No. 8,807,431;
U.S. Pat. No. 8,807,432; U.S. Pat. No. 8,820,630;
International Publication No. 2013/163789;
International Publication No. 2013/173985;
International Publication No. 2014/019130;
International Publication No. 2014/110495;
U.S. Patent Application Publication No. 2008/0185432;
U.S. Patent Application Publication No. 2009/0134221;
U.S. Patent Application Publication No. 2010/0177080;
U.S. Patent Application Publication No. 2010/0177076;
U.S. Patent Application Publication No. 2010/0177707;
U.S. Patent Application Publication No. 2010/0177749;
U.S. Patent Application Publication No. 2011/0202554;
U.S. Patent Application Publication No. 2012/0111946;
U.S. Patent Application Publication No. 2012/0138685;
U.S. Patent Application Publication No. 2012/0168511;
U.S. Patent Application Publication No. 2012/0168512;
U.S. Patent Application Publication No. 2012/0193423;
U.S. Patent Application Publication No. 2012/0203647;
U.S. Patent Application Publication No. 2012/0223141;
U.S. Patent Application Publication No. 2012/0228382;
U.S. Patent Application Publication No. 2012/0248188;
U.S. Patent Application Publication No. 2013/0043312;
U.S. Patent Application Publication No. 2013/0056285;
U.S. Patent Application Publication No. 2013/0070322;
U.S. Patent Application Publication No. 2013/0075168;
U.S. Patent Application Publication No. 2013/0082104;
U.S. Patent Application Publication No. 2013/0175341;
U.S. Patent Application Publication No. 2013/0175343;
U.S. Patent Application Publication No. 2013/0200158;
U.S. Patent Application Publication No. 2013/0256418;
U.S. Patent Application Publication No. 2013/0257744;
U.S. Patent Application Publication No. 2013/0257759;
U.S. Patent Application Publication No. 2013/0270346;
U.S. Patent Application Publication No. 2013/0278425;
U.S. Patent Application Publication No. 2013/0287258;
U.S. Patent Application Publication No. 2013/0292475;
U.S. Patent Application Publication No. 2013/0292477;
U.S. Patent Application Publication No. 2013/0293539;
U.S. Patent Application Publication No. 2013/0293540;
U.S. Patent Application Publication No. 2013/0306728;
U.S. Patent Application Publication No. 2013/0306730;
U.S. Patent Application Publication No. 2013/0306731;
U.S. Patent Application Publication No. 2013/0307964;
U.S. Patent Application Publication No. 2013/0308625;
U.S. Patent Application Publication No. 2013/0313324;
U.S. Patent Application Publication No. 2013/0313325;
U.S. Patent Application Publication No. 2013/0341399;
U.S. Patent Application Publication No. 2013/0342717;
U.S. Patent Application Publication No. 2014/0001267;
U.S. Patent Application Publication No. 2014/0002828;
U.S. Patent Application Publication No. 2014/0008430;
U.S. Patent Application Publication No. 2014/0008439;
U.S. Patent Application Publication No. 2014/0025584;
U.S. Patent Application Publication No. 2014/0027518;
U.S. Patent Application Publication No. 2014/0034734;
U.S. Patent Application Publication No. 2014/0036848;
U.S. Patent Application Publication No. 2014/0039693;
U.S. Patent Application Publication No. 2014/0042814;
U.S. Patent Application Publication No. 2014/0049120;
U.S. Patent Application Publication No. 2014/0049635;
U.S. Patent Application Publication No. 2014/0061305;
U.S. Patent Application Publication No. 2014/0061306;
U.S. Patent Application Publication No. 2014/0063289;
U.S. Patent Application Publication No. 2014/0066136;
U.S. Patent Application Publication No. 2014/0067692;
U.S. Patent Application Publication No. 2014/0070005;
U.S. Patent Application Publication No. 2014/0071840;
U.S. Patent Application Publication No. 2014/0074746;
U.S. Patent Application Publication No. 2014/0075846;
U.S. Patent Application Publication No. 2014/0076974;
U.S. Patent Application Publication No. 2014/0078341;
U.S. Patent Application Publication No. 2014/0078342;
U.S. Patent Application Publication No. 2014/0078345;
U.S. Patent Application Publication No. 2014/0084068;
U.S. Patent Application Publication No. 2014/0097249;
U.S. Patent Application Publication No. 2014/0098792;
U.S. Patent Application Publication No. 2014/0100774;
U.S. Patent Application Publication No. 2014/0100813;
U.S. Patent Application Publication No. 2014/0103115;
U.S. Patent Application Publication No. 2014/0104413;
U.S. Patent Application Publication No. 2014/0104414;
U.S. Patent Application Publication No. 2014/0104416;
U.S. Patent Application Publication No. 2014/0104451;
U.S. Patent Application Publication No. 2014/0106594;
U.S. Patent Application Publication No. 2014/0106725;
U.S. Patent Application Publication No. 2014/0108010;
U.S. Patent Application Publication No. 2014/0108402;
U.S. Patent Application Publication No. 2014/0108682;
U.S. Patent Application Publication No. 2014/0110485;
U.S. Patent Application Publication No. 2014/0114530;
U.S. Patent Application Publication No. 2014/0124577;
U.S. Patent Application Publication No. 2014/0124579;
U.S. Patent Application Publication No. 2014/0125842;
U.S. Patent Application Publication No. 2014/0125853;
U.S. Patent Application Publication No. 2014/0125999;
U.S. Patent Application Publication No. 2014/0129378;
U.S. Patent Application Publication No. 2014/0131438;
U.S. Patent Application Publication No. 2014/0131441;
U.S. Patent Application Publication No. 2014/0131443;
U.S. Patent Application Publication No. 2014/0131444;
U.S. Patent Application Publication No. 2014/0131445;
U.S. Patent Application Publication No. 2014/0131448;
U.S. Patent Application Publication No. 2014/0133379;
U.S. Patent Application Publication No. 2014/0136208;
U.S. Patent Application Publication No. 2014/0140585;
U.S. Patent Application Publication No. 2014/0151453;
U.S. Patent Application Publication No. 2014/0152882;
U.S. Patent Application Publication No. 2014/0158770;
U.S. Patent Application Publication No. 2014/0159869;
U.S. Patent Application Publication No. 2014/0160329;
U.S. Patent Application Publication No. 2014/0166755;
U.S. Patent Application Publication No. 2014/0166757;
U.S. Patent Application Publication No. 2014/0166759;

U.S. Patent Application Publication No. 2014/0166760;
U.S. Patent Application Publication No. 2014/0166761;
U.S. Patent Application Publication No. 2014/0168787;
U.S. Patent Application Publication No. 2014/0175165;
U.S. Patent Application Publication No. 2014/0175169;
U.S. Patent Application Publication No. 2014/0175172;
U.S. Patent Application Publication No. 2014/0175174;
U.S. Patent Application Publication No. 2014/0191644;
U.S. Patent Application Publication No. 2014/0191913;
U.S. Patent Application Publication No. 2014/0197238;
U.S. Patent Application Publication No. 2014/0197239;
U.S. Patent Application Publication No. 2014/0197304;
U.S. Patent Application Publication No. 2014/0203087;
U.S. Patent Application Publication No. 2014/0204268;
U.S. Patent Application Publication No. 2014/0214631;
U.S. Patent Application Publication No. 2014/0217166;
U.S. Patent Application Publication No. 2014/0217180;
U.S. patent application Ser. No. 13/367,978 for a Laser Scanning Module Employing an Elastomeric U-Hinge Based Laser Scanning Assembly, filed Feb. 7, 2012 (Feng et al.);
U.S. patent application Ser. No. 29/436,337 for an Electronic Device, filed Nov. 5, 2012 (Fitch et al.);
U.S. patent application Ser. No. 13/771,508 for an Optical Redirection Adapter, filed Feb. 20, 2013 (Anderson);
U.S. patent application Ser. No. 13/852,097 for a System and Method for Capturing and Preserving Vehicle Event Data, filed Mar. 28, 2013 (Barker et al.);
U.S. patent application Ser. No. 13/902,110 for a System and Method for Display of Information Using a Vehicle-Mount Computer, filed May 24, 2013 (Hollifield);
U.S. patent application Ser. No. 13/902,144, for a System and Method for Display of Information Using a Vehicle-Mount Computer, filed May 24, 2013 (Chamberlin);
U.S. patent application Ser. No. 13/902,242 for a System For Providing A Continuous Communication Link With A Symbol Reading Device, filed May 24, 2013 (Smith et al.);
U.S. patent application Ser. No. 13/912,262 for a Method of Error Correction for 3D Imaging Device, filed Jun. 7, 2013 (Jovanovski et al.);
U.S. patent application Ser. No. 13/912,702 for a System and Method for Reading Code Symbols at Long Range Using Source Power Control, filed Jun. 7, 2013 (Xian et al.);
U.S. patent application Ser. No. 29/458,405 for an Electronic Device, filed Jun. 19, 2013 (Fitch et al.);
U.S. patent application Ser. No. 13/922,339 for a System and Method for Reading Code Symbols Using a Variable Field of View, filed Jun. 20, 2013 (Xian et al.);
U.S. patent application Ser. No. 13/927,398 for a Code Symbol Reading System Having Adaptive Autofocus, filed Jun. 26, 2013 (Todeschini);
U.S. patent application Ser. No. 13/930,913 for a Mobile Device Having an Improved User Interface for Reading Code Symbols, filed Jun. 28, 2013 (Gelay et al.);
U.S. patent application Ser. No. 29/459,620 for an Electronic Device Enclosure, filed Jul. 2, 2013 (London et al.);
U.S. patent application Ser. No. 29/459,681 for an Electronic Device Enclosure, filed Jul. 2, 2013 (Chaney et al.);
U.S. patent application Ser. No. 13/933,415 for an Electronic Device Case, filed Jul. 2, 2013 (London et al.);
U.S. patent application Ser. No. 29/459,785 for a Scanner and Charging Base, filed Jul. 3, 2013 (Fitch et al.);
U.S. patent application Ser. No. 29/459,823 for a Scanner, filed Jul. 3, 2013 (Zhou et al.);
U.S. patent application Ser. No. 13/947,296 for a System and Method for Selectively Reading Code Symbols, filed Jul. 22, 2013 (Rueblinger et al.);
U.S. patent application Ser. No. 13/950,544 for a Code Symbol Reading System Having Adjustable Object Detection, filed Jul. 25, 2013 (Jiang);
U.S. patent application Ser. No. 13/961,408 for a Method for Manufacturing Laser Scanners, filed Aug. 7, 2013 (Saber et al.);
U.S. patent application Ser. No. 14/018,729 for a Method for Operating a Laser Scanner, filed Sep. 5, 2013 (Feng et al.);
U.S. patent application Ser. No. 14/019,616 for a Device Having Light Source to Reduce Surface Pathogens, filed Sep. 6, 2013 (Todeschini);
U.S. patent application Ser. No. 14/023,762 for a Handheld Indicia Reader Having Locking Endcap, filed Sep. 11, 2013 (Gannon);
U.S. patent application Ser. No. 14/035,474 for Augmented-Reality Signature Capture, filed Sep. 24, 2013 (Todeschini);
U.S. patent application Ser. No. 29/468,118 for an Electronic Device Case, filed Sep. 26, 2013 (Oberpriller et al.);
U.S. patent application Ser. No. 14/055,234 for Dimensioning System, filed Oct. 16, 2013 (Fletcher);
U.S. patent application Ser. No. 14/053,314 for Indicia Reader, filed Oct. 14, 2013 (Huck);
U.S. patent application Ser. No. 14/065,768 for Hybrid System and Method for Reading Indicia, filed Oct. 29, 2013 (Meier et al.);
U.S. patent application Ser. No. 14/074,746 for Self-Checkout Shopping System, filed Nov. 8, 2013 (Hejl et al.);
U.S. patent application Ser. No. 14/074,787 for Method and System for Configuring Mobile Devices via NFC Technology, filed Nov. 8, 2013 (Smith et al.);
U.S. patent application Ser. No. 14/087,190 for Optimal Range Indicators for Bar Code Validation, filed Nov. 22, 2013 (Hejl);
U.S. patent application Ser. No. 14/094,087 for Method and System for Communicating Information in an Digital Signal, filed Dec. 2, 2013 (Peake et al.);
U.S. patent application Ser. No. 14/101,965 for High Dynamic-Range Indicia Reading System, filed Dec. 10, 2013 (Xian);
U.S. patent application Ser. No. 14/150,393 for Indicia-reader Having Unitary Construction Scanner, filed Jan. 8, 2014 (Colavito et al.);
U.S. patent application Ser. No. 14/154,207 for Laser Barcode Scanner, filed Jan. 14, 2014 (Hou et al.);
U.S. patent application Ser. No. 14/165,980 for System and Method for Measuring Irregular Objects with a Single Camera filed Jan. 28, 2014 (Li et al.);
U.S. patent application Ser. No. 14/166,103 for Indicia Reading Terminal Including Optical Filter filed Jan. 28, 2014 (Lu et al.);
U.S. patent application Ser. No. 14/200,405 for Indicia Reader for Size-Limited Applications filed Mar. 7, 2014 (Feng et al.);
U.S. patent application Ser. No. 14/231,898 for Hand-Mounted Indicia-Reading Device with Finger Motion Triggering filed Apr. 1, 2014 (Van Horn et al.);
U.S. patent application Ser. No. 14/250,923 for Reading Apparatus Having Partial Frame Operating Mode filed Apr. 11, 2014, (Deng et al.);
U.S. patent application Ser. No. 14/257,174 for Imaging Terminal Having Data Compression filed Apr. 21, 2014, (Barber et al.);

U.S. patent application Ser. No. 14/257,364 for Docking System and Method Using Near Field Communication filed Apr. 21, 2014 (Showering);

U.S. patent application Ser. No. 14/264,173 for Autofocus Lens System for Indicia Readers filed Apr. 29, 2014 (Ackley et al.);

U.S. patent application Ser. No. 14/274,858 for Mobile Printer with Optional Battery Accessory filed May 12, 2014 (Marty et al.);

U.S. patent application Ser. No. 14/277,337 for MULTIPURPOSE OPTICAL READER, filed May 14, 2014 (Jovanovski et al.);

U.S. patent application Ser. No. 14/283,282 for TERMINAL HAVING ILLUMINATION AND FOCUS CONTROL filed May 21, 2014 (Liu et al.);

U.S. patent application Ser. No. 14/300,276 for METHOD AND SYSTEM FOR CONSIDERING INFORMATION ABOUT AN EXPECTED RESPONSE WHEN PERFORMING SPEECH RECOGNITION, filed Jun. 10, 2014 (Braho et al.);

U.S. patent application Ser. No. 14/305,153 for INDICIA READING SYSTEM EMPLOYING DIGITAL GAIN CONTROL filed Jun. 16, 2014 (Xian et al.);

U.S. patent application Ser. No. 14/310,226 for AUTOFOCUSING OPTICAL IMAGING DEVICE filed Jun. 20, 2014 (Koziol et al.);

U.S. patent application Ser. No. 14/327,722 for CUSTOMER FACING IMAGING SYSTEMS AND METHODS FOR OBTAINING IMAGES filed Jul. 10, 2014 (Oberpriller et al,);

U.S. patent application Ser. No. 14/327,827 for a MOBILE-PHONE ADAPTER FOR ELECTRONIC TRANSACTIONS, filed Jul. 10, 2014 (Hejl);

U.S. patent application Ser. No. 14/329,303 for CELL PHONE READING MODE USING IMAGE TIMER filed Jul. 11, 2014 (Coyle);

U.S. patent application Ser. No. 14/333,588 for SYMBOL READING SYSTEM WITH INTEGRATED SCALE BASE filed Jul. 17, 2014 (Barten);

U.S. patent application Ser. No. 14/334,934 for a SYSTEM AND METHOD FOR INDICIA VERIFICATION, filed Jul. 18, 2014 (Hejl);

U.S. patent application Ser. No. 14/336,188 for METHOD OF AND SYSTEM FOR DETECTING OBJECT WEIGHING INTERFERENCES, Filed Jul. 21, 2014 (Amundsen et al.);

U.S. patent application Ser. No. 14/339,708 for LASER SCANNING CODE SYMBOL READING SYSTEM, filed Jul. 24, 2014 (Xian et al.);

U.S. patent application Ser. No. 14/340,627 for an AXIALLY REINFORCED FLEXIBLE SCAN ELEMENT, filed Jul. 25, 2014 (Rueblinger et al.);

U.S. patent application Ser. No. 14/340,716 for an OPTICAL IMAGER AND METHOD FOR CORRELATING A MEDICATION PACKAGE WITH A PATIENT, filed Jul. 25, 2014 (Ellis);

U.S. patent application Ser. No. 14/342,544 for Imaging Based Barcode Scanner Engine with Multiple Elements Supported on a Common Printed Circuit Board filed Mar. 4, 2014 (Liu et al.);

U.S. patent application Ser. No. 14/345,735 for Optical Indicia Reading Terminal with Combined Illumination filed Mar. 19, 2014 (Ouyang);

U.S. patent application Ser. No. 14/336,188 for METHOD OF AND SYSTEM FOR DETECTING OBJECT WEIGHING INTERFERENCES, Filed Jul. 21, 2014 (Amundsen et al.);

U.S. patent application Ser. No. 14/355,613 for Optical Indicia Reading Terminal with Color Image Sensor filed May 1, 2014 (Lu et al.);

U.S. patent application Ser. No. 14/370,237 for WEB-BASED SCAN-TASK ENABLED SYSTEM AND METHOD OF AND APPARATUS FOR DEVELOPING AND DEPLOYING THE SAME ON A CLIENT-SERVER NETWORK filed Jul. 2, 2014 (Chen et al.);

U.S. patent application Ser. No. 14/370,267 for INDUSTRIAL DESIGN FOR CONSUMER DEVICE BASED SCANNING AND MOBILITY, filed Jul. 2, 2014 (Ma et al.);

U.S. patent application Ser. No. 14/376,472, for an ENCODED INFORMATION READING TERMINAL INCLUDING HTTP SERVER, filed Aug. 4, 2014 (Lu);

U.S. patent application Ser. No. 14/379,057 for METHOD OF USING CAMERA SENSOR INTERFACE TO TRANSFER MULTIPLE CHANNELS OF SCAN DATA USING AN IMAGE FORMAT filed Aug. 15, 2014 (Wang et al.);

U.S. patent application Ser. No. 14/452,697 for INTERACTIVE INDICIA READER, filed Aug. 6, 2014 (Todeschini);

U.S. patent application Ser. No. 14/453,019 for DIMENSIONING SYSTEM WITH GUIDED ALIGNMENT, filed Aug. 6, 2014 (Li et al.);

U.S. patent application Ser. No. 14/460,387 for APPARATUS FOR DISPLAYING BAR CODES FROM LIGHT EMITTING DISPLAY SURFACES filed Aug. 15, 2014 (Van Horn et al.);

U.S. patent application Ser. No. 14/460,829 for ENCODED INFORMATION READING TERMINAL WITH WIRELESS PATH SELECTON CAPABILITY, filed Aug. 15, 2014 (Wang et al.);

U.S. patent application Ser. No. 14/462,801 for MOBILE COMPUTING DEVICE WITH DATA COGNITION SOFTWARE, filed on Aug. 19, 2014 (Todeschini et al.);

U.S. patent application Ser. No. 14/446,387 for INDICIA READING TERMINAL PROCESSING PLURALITY OF FRAMES OF IMAGE DATA RESPONSIVELY TO TRIGGER SIGNAL ACTIVATION filed Jul. 30, 2014 (Wang et al.);

U.S. patent application Ser. No. 14/446,391 for MULTIFUNCTION POINT OF SALE APPARATUS WITH OPTICAL SIGNATURE CAPTURE filed Jul. 30, 2014 (Good et al.);

U.S. patent application Ser. No. 29/486,759 for an Imaging Terminal, filed Apr. 2, 2014 (Oberpriller et al.);

U.S. patent application Ser. No. 29/492,903 for an INDICIA SCANNER, filed Jun. 4, 2014 (Zhou et al.); and U.S. patent application Ser. No. 29/494,725 for an IN-COUNTER BARCODE SCANNER, filed Jun. 24, 2014 (Oberpriller et al.).

In the specification and/or figures, typical embodiments of the invention have been disclosed. The present invention is not limited to such exemplary embodiments. The use of the term "and/or" includes any and all combinations of one or more of the associated listed items. The figures are schematic representations and so are not necessarily drawn to scale. Unless otherwise noted, specific terms have been used in a generic and descriptive sense and not for purposes of limitation.

What is claimed, is:

1. A method for scanning a graphic medium scan target, the method comprising the steps of:

capturing a single image of the scan target over an exposure duration;

actuating an illumination of the scan target at the beginning of the exposure duration over an illumination duration that is less than the exposure duration; and deactivating the illumination of the scan target upon an expiration of the illumination duration;

wherein the exposure duration persists for a period comprising a positive multiple of the illumination duration after expiration of the illumination duration.

2. The method as described in claim 1 wherein the capturing the image of the scan target over the exposure duration step comprises the steps of:

actuating a sensor operable for detecting the image; and actuating a shutter operable for exposing the actuated sensor to the scan target over the exposure duration.

3. The method as described in claim 1 wherein the graphic medium comprises one or more of an electronic display, a self-lit medium, or a print based medium.

4. The method as described in claim 1 wherein the captured image comprises one or more of a two dimensional (2D) geometric pattern or a barcode, wherein the illumination duration is between 200-400 ms.

5. The method as described in claim 4, further comprising evaluating a quality related characteristic of the captured image relative to a target quality metric.

6. The method as described in claim 5 wherein one or more of the quality related characteristic of the captured image, or the target quality metric, comprises an image quality measurement relating to one or more of a grey level, a saturation level, or a blackness level.

7. The method as described in claim 5 wherein the image quality measurement is determined globally in relation to the captured image.

8. The method as described in claim 5 wherein the image quality measurement is determined locally in relation to at least a portion of the captured image.

9. The method as described in claim 5, further comprising the steps of:

determining, based on the evaluating step, that the quality related characteristic of the captured image does not at least meet the target quality value, wherein the captured image comprises a first captured image; and increasing the exposure duration to one or more increased exposure duration values;

repeating the capturing, actuating, and deactivating steps iteratively over the one or more increased exposure duration values wherein one or more subsequent corresponding images are captured; and repeating the evaluating step iteratively over the one or more subsequent captured images until:

the quality related characteristic of at least one of the subsequent corresponding evaluated captured images at least meets the target quality value; or a maximum increased exposure duration value has been reached.

10. The method as described in claim 9 wherein the illumination duration comprises a first set illumination duration and wherein, upon reaching the maximum increased exposure duration value, the method further comprises the steps of:

resetting the illumination duration from the first set illumination duration to one or more increased illumination durations;

repeating the capturing step iteratively over the one or more increased illumination durations wherein one or more subsequent corresponding second images are captured; and repeating the evaluating step iteratively over the one or more subsequent captured second images until:

the quality related characteristic of at least one of the subsequent corresponding evaluated captured second images at least meets the target quality value; or a maximum increased illumination time duration time has been reached.

11. A system for scanning a graphic medium scan target, the system comprising:

a detector component operable, upon actuating an exposure, for capturing a single image the scan target over a duration of the exposure actuation;

a light source component operable, upon actuating an illumination, for illuminating the scan target at the beginning of the exposure duration over an illumination duration that is less than the exposure duration, and upon an expiration of the illumination duration, for deactivating the illumination of the scan target;

an exposure regulating component operable for setting the exposure duration and for the actuating the exposure for a period comprising a positive multiple of the illumination duration after expiration of the illumination duration;

an illumination regulating component operable for setting the illumination duration time and for the actuating, and the deactivating, the illumination; and a controller component operable for controlling exchanging data signals with the detector component, the exposure regulating component and the illumination regulating component, for controlling one or more functions of the detector component, the exposure regulating component, and the illumination regulating component based on the data signals exchanged each therewith, and for directing the scanning over the graphic medium scan target based on the controlling the one or more functions of the detector component, the exposure regulating component, and the illumination regulating component.

12. The system as described in claim 11, further comprising a non-transitory computer readable storage medium comprising instructions wherein one or more of the controller component, the exposure regulating component or the illumination regulating component are operable for executing the instructions and performing a process corresponding thereto, the process comprising:

the capturing the image of the scan target over the exposure duration;

the actuating the illumination of the scan target over the illumination duration, wherein the illumination duration is between 200-400 ms; and the deactivating the illumination of the scan target upon the expiration of the illumination duration.

13. The system as described in claim 11 wherein the detector component comprises:

a sensor device operable, upon the actuating the exposure, for the capturing the image of the scan target; and a shutter device operable for exposing the sensor device, upon the actuating the exposure.

14. The system as recited in claim 13 wherein the shutter device is actuated electromechanically, wherein the exposing the sensor device comprises opening the shutter device, or electro-optically, wherein the exposing the sensor device comprises the shutter assuming a transparent optical state.

15. The system as described in claim 11 wherein the graphic medium comprises one or more of an electronic display, a self-lit medium, or a print based medium.

16. The system as described in claim 11 wherein the captured image comprises one or more of a 2D geometric pattern or a barcode.

17. The system as described in claim 11 wherein the controller component is further operable for evaluating a quality related characteristic of the captured image in relation to a target quality metric.

18. A method for capturing graphic data presented with a scan target related to one or more of a printed medium or a self-lit electronic display medium, the method comprising the steps of:
   fixing a duration and an intensity related to an illumination;
   taking a single image of the scan target with the fixed illumination related duration and intensity over a first exposure duration wherein the fixed illumination related duration begins at the beginning of the exposure duration, the first exposure duration comprising a positive multiple of the fixed illumination related duration after expiration of the fixed illumination related duration;
   evaluating the taken image in relation to a quality related characteristic thereof;
   adjusting the exposure duration relative to the first exposure duration; and
   repeating the steps of taking the image and evaluating the image with the adjusted exposure duration until the evaluated quality related image characteristic at least equals a value of a quality related target.

19. The method as described in claim 18 wherein the fixed illumination related duration is between 200-400 ms and wherein, upon the adjusting the exposure duration step, the exposure duration reaches a maximum adjustment value, the method further comprising the steps of:
   resetting a fixedness of the fixed illumination related duration wherein the illumination related duration is adjusted to an adjusted illumination duration greater than the fixed illumination related duration; and
   repeating the steps of taking the image and evaluating the image with the adjusted illumination duration until the evaluated quality related image characteristic at least equals the value of the quality related target.

20. The method as described in claim 19 wherein, upon the repeating the steps of taking the image and evaluating the image with the adjusted illumination duration wherein the illumination duration reaches a maximum adjustment value and wherein the evaluated quality related image characteristic fails to at least equal the value of the quality related target, the method further comprising accepting an image having an evaluated quality related characteristic value thereof closest to the quality related target.

* * * * *